April 26, 1960

J. R. MOORE ET AL 2,933,980

INTEGRATED AIRCRAFT AND FIRE CONTROL AUTOPILOT

Filed Aug. 3, 1953

INVENTORS
JOHN R. MOORE
DAVID G. SOERGEL

BY William P. Lane

ATTORNEY.

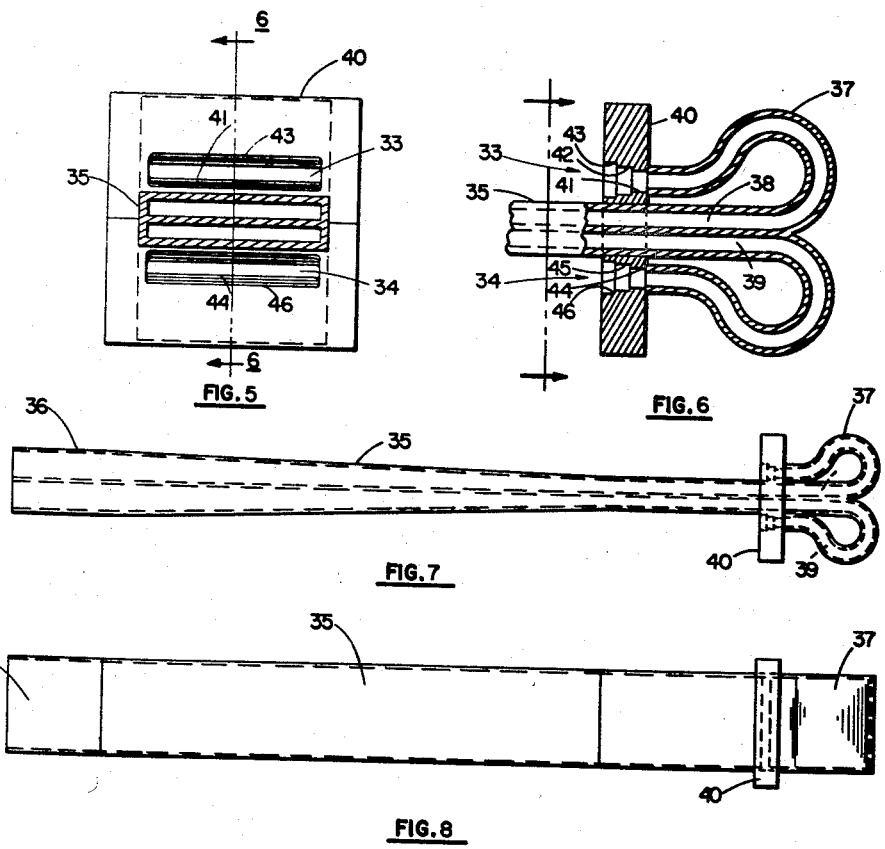

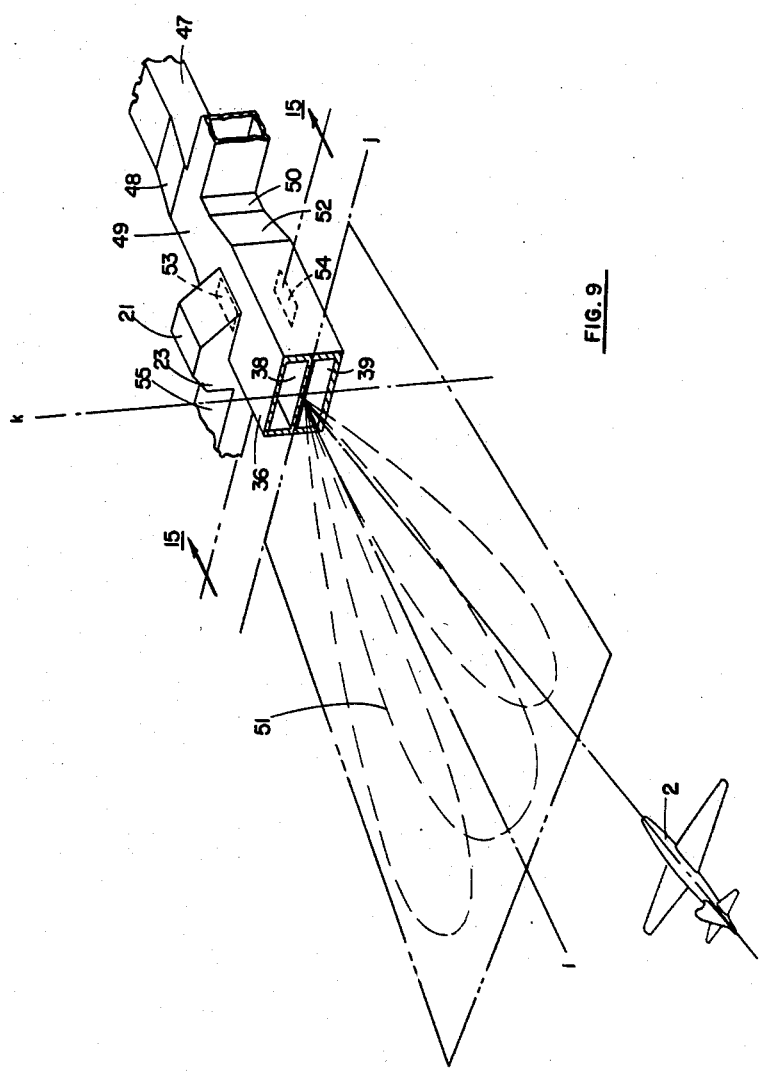

INVENTORS
JOHN R. MOORE
DAVID G. SOERGEL
BY
William R Lane
ATTORNEY

April 26, 1960   J. R. MOORE ET AL   2,933,980
INTEGRATED AIRCRAFT AND FIRE CONTROL AUTOPILOT
Filed Aug. 3, 1953   24 Sheets-Sheet 11

INVENTORS
JOHN R. MOORE
DAVID G. SOERGEL
BY William R Lane
ATTORNEY

April 26, 1960     J. R. MOORE ET AL     2,933,980
INTEGRATED AIRCRAFT AND FIRE CONTROL AUTOPILOT
Filed Aug. 3, 1953     24 Sheets—Sheet 13

INVENTORS
JOHN R. MOORE
DAVID G. SOERGEL
BY
William R. Lane
ATTORNEY

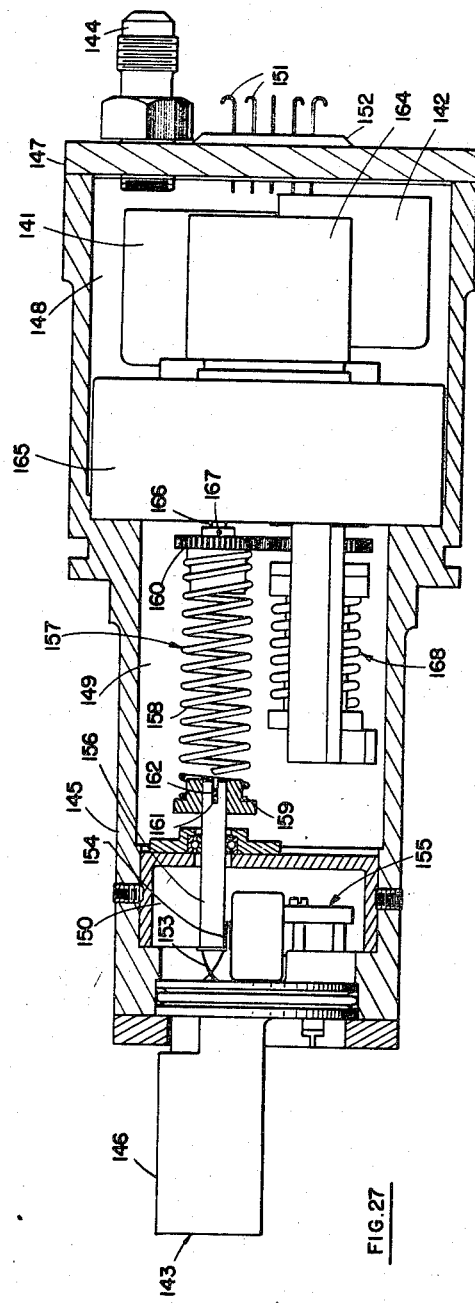
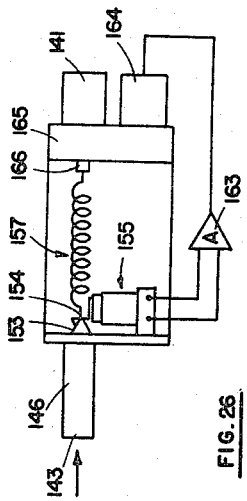
FIG. 26
FIG. 27
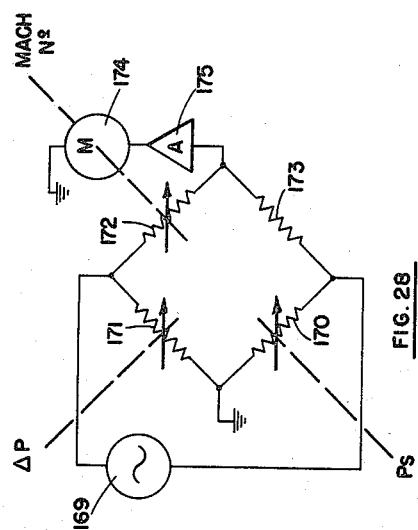
FIG. 28
INVENTORS
JOHN R. MOORE
DAVID G. SOERGEL April 26, 1960 — J. R. MOORE ET AL — 2,933,980
INTEGRATED AIRCRAFT AND FIRE CONTROL AUTOPILOT
Filed Aug. 3, 1953 — 24 Sheets-Sheet 15

INVENTORS
JOHN R. MOORE
DAVID G. SOERGEL
BY
William R Lane
ATTORNEY

FIG. 37

April 26, 1960  J. R. MOORE ET AL  2,933,980
INTEGRATED AIRCRAFT AND FIRE CONTROL AUTOPILOT
Filed Aug. 3, 1953  24 Sheets-Sheet 20

INVENTORS
JOHN R. MOORE
DAVID G. SOERGEL
BY
William R. Lane
ATTORNEY

April 26, 1960

J. R. MOORE ET AL 2,933,980

INTEGRATED AIRCRAFT AND FIRE CONTROL AUTOPILOT

Filed Aug. 3, 1953

*INVENTORS*
JOHN R. MOORE
DAVID G. SOERGEL

BY

*William R Lane*

ATTORNEY

United States Patent Office 2,933,980
Patented Apr. 26, 1960

2,933,980
INTEGRATED AIRCRAFT AND FIRE CONTROL AUTOPILOT

John R. Moore, Fullerton, and David G. Soergel, Long Beach, Calif., assignors to North American Aviation, Inc.

Application August 3, 1953, Serial No. 371,756

17 Claims. (Cl. 89—1)

This invention pertains to an airborne automatic aircraft fire control system, and in particular to an airborne automatic aircraft control and fire control system which causes the aircraft to intercept a rapidly moving target by the shortest possible path and automatically fire its weapons to destroy said target. The system combines, by computer means, information received from target tracking equipment, aircraft parameter instrumentation devices, autopilots, and electromechanical transducers, then transmits control signals to the mechanisms which move the control surfaces of the aircraft to cause the aircraft to approach the target with an attitude to cause the weapon firing apparatus to destroy the target.

It is an object of this invention to provide an aircraft control and ballistic fire control system which is airborne to automatically cause an aircraft to intercept a target by a predetermined optimum path, and automatically fire the weapons of the aircraft to destroy the target.

It is another object of this invention to provide an airborne fire control system for an aircraft which combines, by computer means, the information received from target tracking means, and automatic instrumentation means, and directs said aircraft by autopilot means along a predetermined optimum target intercept path, automatically fires the weapon of said aircraft at a predetermined position relative to said target, and automatically compensates for changes in aircraft balance due to weapon firing.

It is another object of this invention to provide an airborne fire control system for aircraft which combines, by computer means, the information received from target tracking means, and automatic instrumentation means, and directs by autopilot means aircraft along a predetermined optimum path to place said military aircraft directly behind a target aircraft.

It is a further object of this invention to provide a system for controlling the approach of an interceptor aircraft to a target aircraft in free space.

It is another object of this invention to provide means for causing an interceptor to follow a predetermined flight pattern relative to a target aircraft.

It is still another object of this invention to provide a system for causing a first aircraft to follow a predetermined course relative to a second aircraft.

It is another object of this invention to provide apparatus for causing the weapons of an interceptor aircraft to intercept the target.

It is yet another object of this invention to provide means for causing an interceptor to approach a target upon a predetermined path.

It is still another object of this invention to provide apparatus for causing an interceptor aircraft to approach a target upon a predetermined path and to automatically fire a ballistic weapon to destroy the target.

Another object of this invention is to provide means for pointing an interceptor in a direction relative to a target and to cause said interceptor to approach said target along a path so that regardless of when the weapons of said interceptor are fired the projectile from said weapons strike and destroy said target.

It is another object of this invention to provide means responsive to the distance between an interceptor and a target and to the velocity of the projectile for automatically firing the weapons upon said interceptor.

It is still another object of this invention to provide apparatus for causing an interceptor aircraft, having ballistic weapons thereon, to approach a target at a predetermined attitude and along a predetermined path relative to said target and to automatically fire said ballistic weapons at a predetermined distance from said target.

It is a further object of this invention to provide means for continuously pointing ballistic weapons upon an interceptor aircraft in the proper direction so that regardless of when the weapons are fired the projectiles therefrom strike and destroy a target.

It is still another object of this invention to provide apparatus for controlling the control surfaces of an interceptor aircraft to cause said interceptor aircraft to approach a target along a predetermined path relative to said target.

It is yet another object of this invention to provide apparatus for controlling the control surfaces of an interceptor to cause said interceptor to approach a target along a predetermined path and to automatically fire ballistic weapons carried by said interceptor at a predetermined distance from said target so that projectiles therefrom strike and destroys said target.

It is another object of this invention to provide a fire flight control system which automatically measures the distance and bearing of a target relative to an interceptor, computes the required attitude and path said interceptor follows, directs the control surfaces of said interceptor by autopilot means to cause said interceptor to follow said path and to assume said attitude, and automatically fires ballistic weapons of said interceptor to thereby destroy said target.

Other objects of invention will become apparent from the following description taken in connection with the accompanying drawings, in which Fig. 1 is a block diagram of the invention;

Fig. 5 is a view taken at 5—5 in Fig. 4;

Fig. 6 is a view taken at 6—6 in Fig. 5;

Fig. 7 is an elevation view of the antenna feed and illumination system of a radar used in this invention;

Fig. 8 is a plan view of the antenna feed and illumination system of a radar used in this invention;

Fig. 9 is a perspective view of a part of the microwave plumbing of a radar used in this invention, showing a target displaced in azimuth from the principal axis of the antenna;

Fig. 26 is a schematic drawing of a typical closed cycle pressure transducer used in the flight data computer of this invention;

Fig. 27 is a side view in section, of the device shown in Fig. 26;

Fig. 28 is a schematic drawing of a Mach number computer;

Fig. 37 is a vector filter used in the prediction circuits of the fire control computer;

Figure 46:
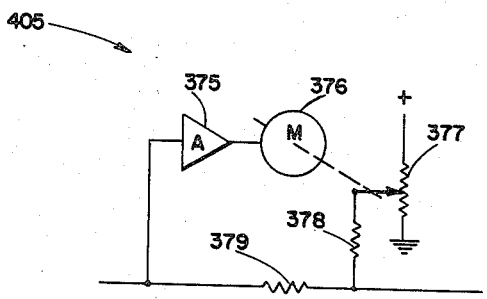

And Fig. 46 is a schematic drawing of an integrating circuit of the pitch channel of an autopilot.

The device of this invention forms an integral part of an aircraft of the interceptor or fighter type which will be designated herein as an interceptor. The angular position and the distance of the target aircraft relative to the interceptor must be measured, the optimum path along which the interceptor must fly to intercept and destroy the target aircraft must be computed, the ballistic or fire control characteristics of the interceptor and its weapons must be mechanized, the interceptor must be piloted along the required path, and the weapons must be fired at the proper time.

This invention is designed to cause the interceptor to fly along one of two paths at the option of the pilot. The first path or mode of attack, called lead collision, causes the interceptor to approach the target by the proper path so that when the weapons are automatically fired, the weapon projectile follows a path which is an extension of the interceptor path and collides with the target. The second path or mode of attack, called lead pursuit, causes the interceptor to follow the shortest path to approach the target aircraft from behind.

The interceptor is controlled by an autopilot. The autopilot is controlled by a fire control computer. The fire control computer receives information from a radar system and a flight data computer. The fire control computer not only directs the autopilot but also fires the interceptor's weapons. The structure and operation of each of the devices mentioned are described in detail hereinafter.

The explanation and description below more particularly sets forth the functional and structural relation between the mentioned portions of this device and explains their use, in combination, to achieve the new result of providing a more accurate and reliable fire and flight control device than any heretofore known in the fire control and military aircraft art. Thus the device of this invention provides an integrated fire control system for an interceptor which detects the target, determines the range and bearing of the target, automatically pilots the interceptor along an optimum path to the target, and fires the interceptor's weapons at the target within a proper predetermined range from the target.

Figure 1:
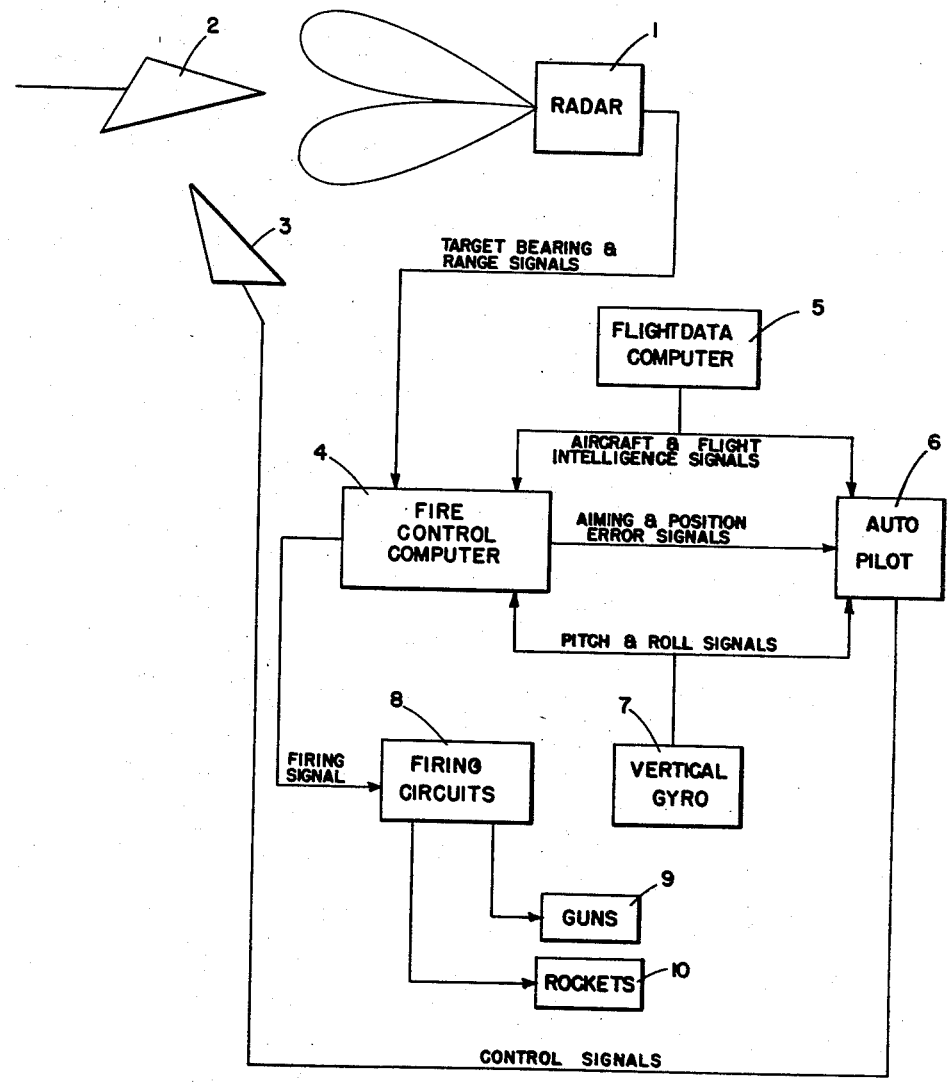

In Fig. 1, radar system 1 detects target 2 and transmits a signal of the relative range and bearing of target 2 relative to interceptor 3 to fire control computer 4. Flight data computer 5 computes aircraft parameters such as, Mach number, angle of attack, angle of skid, static pressure, pressure differential, true air speed, and air density, and communicates the computed information to fire control computer 4 and autopilot 6. Vertical gyroscope 7 communicates information concerning pitch and roll angles of the interceptor to both fire control computer 4 and autopilot 6. Fire control computer 4 continuously computes the error between the true heading and the desired heading of interceptor 3. Fire control computer 4 communicates the error signals to autopilot 6. Auto pilot 6 controls the control surfaces of interceptor 3. When interceptor 3 reaches the proper position upon a lead-collision course, fire control computer 4 signals firing circuits 8 which, in turn, fire guns 9, rockets 10, or both. Computing means used in this invention are preferably analogue computing means but may be digital computing means. The circuits described hereafter are given by way of example only to illustrate the mechanization of the various major components of this invention. Parameters are supplied mechanically from one portion of this invention to the other by means of shaft rotations, or are transmitted electrically from one portion of this invention to the other by means of electrical signals. The parameters are transformed from mechanical shaft rotations to electrical signals by means of potentiometers, synchros, resolvers, and other electromechanical transducers.

Radar

Although radar systems of different types may obviously be used in this invention, a particular radar system is described herein. The various parts of the radar system and mount together with its drives are shown and claimed in patent applications Serial No. 216,145, filed March 17, 1951, for "Duomode Monopulse Radar System" in the name of Robert M. Ashby, or in patent application Serial No. 216,133 (now abandoned), filed March 17, 1951, for "Stepped-Slot Microwave Radiation System," in the names of Stanley M. Kerber et al., or in patent application Serial No. 216,143, filed March 17, 1951, for "Folded Wave Guide T," in the name of Amasa Pratt, now U.S. Patent No. 2,764,740, or in patent application Serial No. 152,026, filed March 27, 1950, for "Antenna Mount," in the names of William D. Mullins, Jr., et al., now U.S. Patent No. 2,654,031.

In the past it has been proposed to improve the accuracy of tracking data obtainable from a sequential lobing or conical scan system, by use of a set of simultaneous antenna lobes in order to obtain complete tracking information from the target echo each time a pulse is transmitted and received. If a plurality of microwave energy lobes is created simultaneously, and if, as a consequence, complete information as to the target's bearing and distance is obtained at the pulse repetition frequency, a more satisfactory track of rapidly moving targets can be obtained. Simultaneous lobing schemes thus far proposed, however, have involved the use of a multiplicity of electromagnetic radiators fed from a common source of microwave energy by means of complicated microwave bridges such as the "rat race" or other equally complex microwave plumbing devices. In some schemes the electrical path lengths from the source of microwave energy to each of the radiating elements is different. It is necessary in these cases, therefore, to introduce a phase delay in some of the wave guides to compensate for the relative phase shift resulting in the guides. These phase delay devices are, in general, narrow band devices, i.e., the range of frequencies over which the phase delay has the desired magnitude (without tuning adjustments) is extremely narrow. In addition, most phase shifting devices reduce the power handling capacity of the system. As a result it is necessary, in general, to operate at reduced power over a narrow band of frequencies, reducing the maximum range of the radar and making the radar more susceptible to enemy jamming. In other schemes a fairly simple R-F bridge system is employed, but a wide spacing between radiators is required to obtain sufficient tracking sensitivity. This type system has the inherent disadvantage of a high side-lobe level in the antenna radiation patterns and is thus susceptible to jamming.

Figure 2:
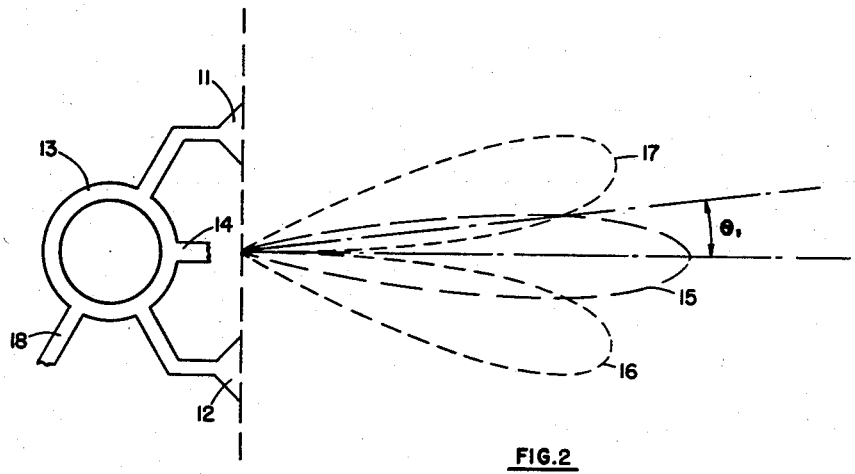
Fig. 2 is a schematic drawing of a simple radar two-dimensional monopulse or simultaneous lobing system.

Referring to Fig. 2, a simple monopulse or simultaneous lobing radar system for locating a target in a single plane is shown. Radiators 11 and 12 are fed with equal amounts of power by means of rat race 13, such as is described in detail in the book Microwave Transmission Design Data, by Theodore Moreno, at page 181 et seq. The radiation pattern of the two radiators in the plane of the paper is of the form $$F(\theta_1) = 2E(\theta_1) \cos\left(\frac{s}{2t} \sin \theta_1 + \frac{\phi_1}{2}\right)$$

where $E(\theta_1)$ is the radiation pattern for a single radiator, $\phi_1$ is the relative phase of the two radiators, $s$ is the distance between the two radiators, and $\theta_1$ is measured as shown in Fig. 2. If the two radiators are fed with electromagnetic waves in-phase through arm 14 of rat race 13, the resultant radiation pattern for the two radiators may be represented by curve 15 in Fig. 2. The range of a target may be measured therefore by measuring the time elapsing between the transmission of a pulse of electromagnetic energy by the radiators, and the reception of an echo from the target in accordance with well-known radar theory.

If now the two radiators are fed with electromagnetic waves out-of-phase, the resultant radiation pattern for the two radiators are represented by curves 16 and 17 of Fig. 2, since near the axis of symmetry, energy from the two radiators tends to cancel out if out-of-phase; whereas outboard therefrom such cancellation does not occur. In fact, reinforcement occurs at the maxima of the two lobes. When conventional radar receivers are connected to receive signals from arms 14 and 18 the output of these receivers is used to obtain the location of a target in the plane of Fig. 2. Since arm 14 of rat race 13 is equidistant from radiators 1 and 2, in-phase echoes received by the radiators are transmitted through arm 14 to its receiver. Likewise, because arm 18 is an odd multiple of half-wave lengths farther from radiator 11 than from radiator 12, out-of-phase echoes received by the radiators tend to add, as seen from arm 18 by its receiver; while in-phase echoes as seen from arm 18 will cancel out. Therefore, when a target is on-axis, i.e., when it is directly in front of the two radiators and on a perpendicular bisector erected to a line joining the two radiators, no energy due to return echo is received through arm 18, but energy is received through arm 14. That it is received through arm 14 indicates the presence of the target, and the fact that it is not received through arm 18 indicates that the target is exactly on-axis and that, therefore, the radiators are pointed toward the target. On the other hand, when the target is slightly off-axis, both in-phase and out-of-phase echoes are received by radiators 11 and 12, and the out-of-phase component thereof is transmitted through arm 18 of rat race 13 to its receiver. The magnitude of the out-of-phase echo indicates the extent to which the target is off-axis (for small errors), and corrective action directed toward reorienting radiators 11 and 12 upon a target is initiated. In order to provide three dimensional information about a target with the system just described it would be necessary to provide at least four radiators in order that the amount by which a target is off-axis, both in elevation and azimuth, may be indicated. Such a system would obviously involve the use of multiple rat races or magic T's, the effect of which is to create a bulky radar which would be frequency-sensitive or narrow-band.

In order to understand and appreciate fully the unique features of the radar to be presently described, it is appropriate to review briefly as a point of departure in this discussion some of the basic principles of microwave transmission upon which its operation depends. In this discussion a wave guide is taken to mean a parallel-epipedal dielectric medium with a closed conducting boundary. A double rectangular wave guide is defined as "two wave guides having one conducting boundary in common." If a generator of very high frequency electromagnetic waves is connected to one end of a wave guide, an example of such a generator being a magnetron or cavity resonator, the wave guide may transmit the electromagnetic waves in a wide variety of modes, depending upon the relation between the geometry of the guide and the nature of the generated waves. This invention concerns itself primarily with a class of modes of transmission which has become known as "transverse electric." It is understood to mean that the magnetic field has a component parallel to the wave guide axis, but the electrical field therein is everywhere transverse to the axis. Transverse electric waves are further identified by indicating by subscripts the number of half-period variations in transverse field intensity along the short and long dimension of the wave guide cross-section, respectively. For instance, the dominant mode in rectangular wave guides is the $TE_{01}$ mode, indicating that the wave is of the transverse electric type, that there is no variation in the transverse field along the short dimension, and that there is a single half-wave variation of transverse field along the long dimension thereof. Similarly, $TE_{02}$ mode indicates that there is no variation in the transverse field along the short dimension of the wave guide cross-section, and two half-wave variations of transverse field along the long dimension thereof. Considered from another point of view, one might say that in cutting the wave guide at any particular plane normal to its axis one would find that equal and opposite electrical charges exist in the opposite sides of the wave guide along which variations of transverse field exist. These opposing charges, of course, are corollary to the existence of the field.

It has long been considered that to propagate electromagnetic waves in more than one mode in a wave guide is inefficient for the reason that normally only one of the modes can be successfully coupled to any load, and energy in the other mode is, therefore, largely wasted. However, the radar described herein propagates two modes successfully, simultaneously in the same wave guide; and by an improved bridge system, couples out both modes without undue loss.

Figure 3:
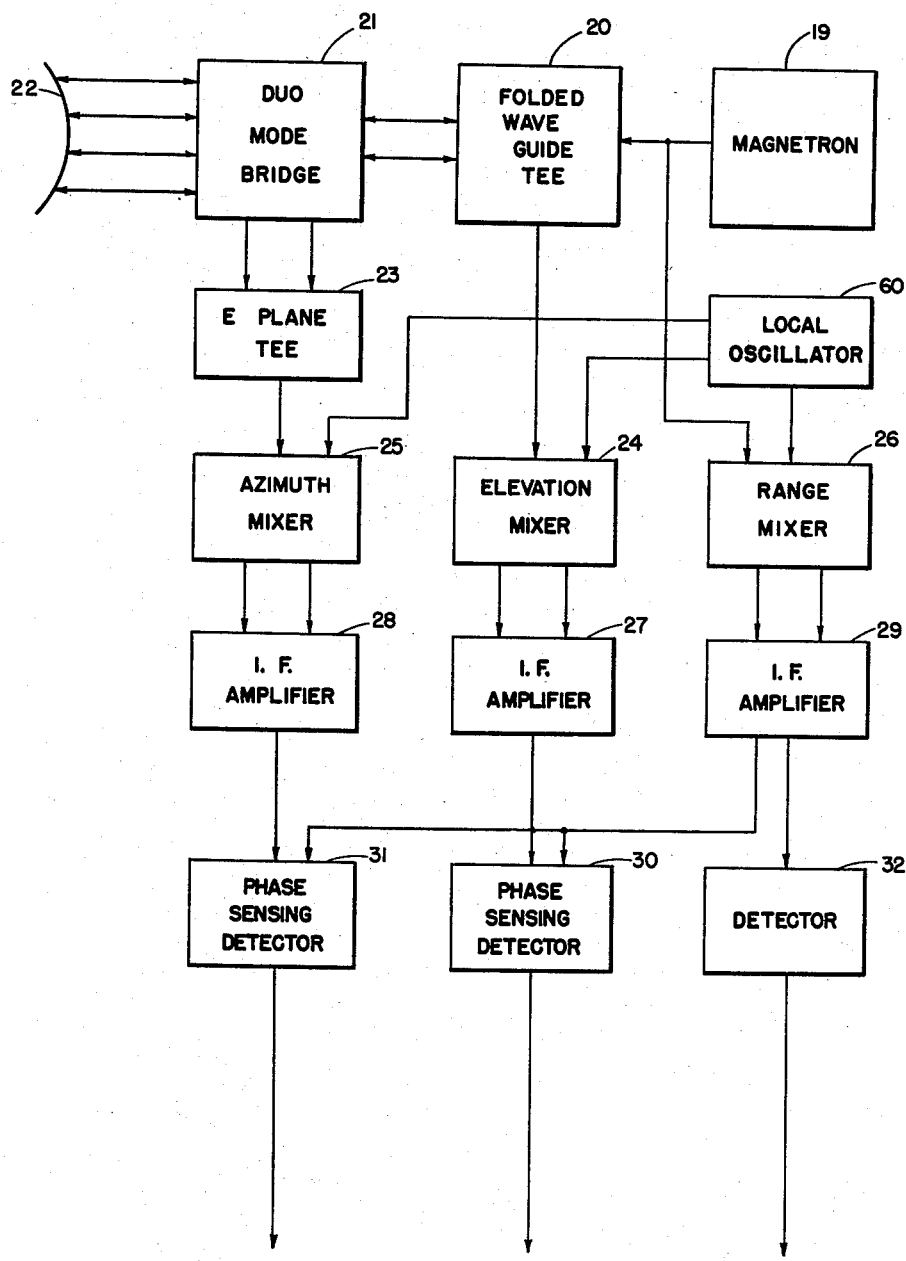
Fig. 3 is a block diagram of the electronic portion of a radar.

Now referring to Fig. 3, magnetron 19 generates pulses of microwave energy which, in turn, are fed through folded wave guide T 20 and duomode bridge 21 to antenna reflector 22. Energy reflected from the target is picked up by antenna reflector 22, fed back through bridges 21 and 20 and thence to E-plane T 23, elevation mixer 24, azimuth mixer 25, and range mixer 26. Signals from these mixers are fed through IF amplifiers 27, 28, and 29 to detectors 30, 31, and 32 from which signals indicative of elevation, azimuth, and range to the target are obtained.

Figure 4:
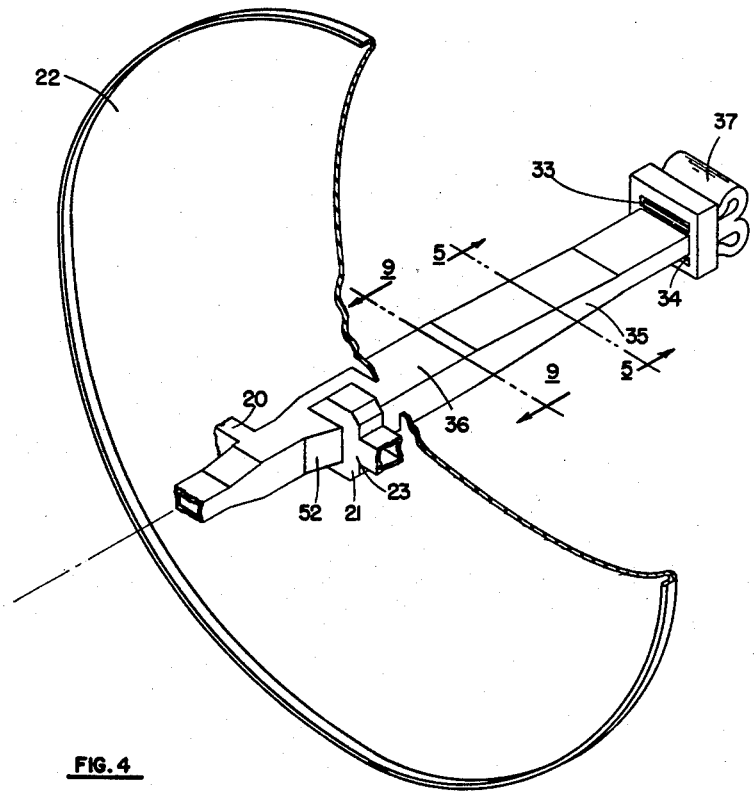
Fig. 4 is a perspective view of a preferred embodiment of the radiator antenna and associated wave guide of a radar used in this invention.

Referring now to Fig. 4, there is shown parabolic reflector 22 for directing electromagnetic energy sharply toward a target and for focusing energy returned from such a target so that it re-enters the R.-F. system from which the original signal came. In Fig. 4, the reflected energy is returned to slots 33 and 34 in antenna feed 35 shown more particularly in Figs. 5 and 6. The purpose of the antenna feed is to illuminate the surface of reflector 22 with microwave energy and to perform the proper impedance match between wave guide 36 and free space.

In Fig. 6, bend section 37 is shown in detail and consists of wave guides 38 and 39, each of which describe a 180° circular bend and are connected to matching plate 40 having steps 41, 42, 43, 44, 45, and 46. Wave guides 38 and 39 are uniformly rectangular in cross section throughout the straight and bend portion thereof, as is shown more particularly in Figs. 7 and 8. Rectangular wave guide sections 38 and 39 are bent as sharply as possible in order that the overall dimension thereof may be kept to a minimum. That this dimension be kept a minimum is necessary in order to minimize aperture blocking. Matching plate 40 is positioned with respect to the parabola such that the effective center of radiation of the output slots of steps 43 and 46 is at the focal point of parabolic reflector 22 in order that microwave energy propagated through the output slots of steps 43 and 46 may properly illuminate the surface of reflector 22, and in order that microwave energy reflected from a target and collected by the reflector will be efficiently focused upon the slot openings of steps 43 and 46, and thence transmitted back through wave guides 38 and 39 to the system whence it came.

In the operation of the device of Figs. 5, 6, 7, and 8, electromagnetic energy is propagated through double wave guide 36, thence through tapered section 35 to wave guides 38 and 39. The taper in wave guide 35 is gradual in order that no sharp discontinuities, the effect of which would be to set up standing waves within the guides and thus produce wasted energy, are permitted. The presence of too high a standing wave within the wave guide system will result in detrimental effects upon the operation of the microwave generator. Wave guide 35 must be tapered to as narrow a dimension as possible so that output slots of steps 43 and 46 may be placed at the spacing which will yield optimum reflector illumination. If the centers of these output slots of steps 43 and 46 are separated by more than approximately 5/8 of the wave length propagated, side lobe radiation from the feed illuminates the reflector, the gain of the antenna is reduced, and the beam width is increased. On the other hand, if the spacing is less than approximately 3/8 of the wave length, too much of the microwave energy "spills over" the edges of the reflector, resulting in wasted energy, higher side lobes, and reduced efficiency of operation. Wave guides 38 and 39 are bent as shown without sharp corners in order to direct the waves propagated within the guide toward the reflector so that the surface thereof may be illuminated without introducing reflection of the energy within the guide system. The function of matching plate 40 is to provide an impedance match between guides 38 and 39 and free space. This match is accomplished by the use of a plurality of stepped enlargements in the guide cross section. It will be noted from Fig. 5 that the steps occur only in the height of the guide, and do not occur in the width thereof. The width of the guide must be above a certain critical dimension in order that transverse electric waves having both one and two half-wave amplitude variations in electric field intensity across the wide dimension of the guide may be propagated therethrough. This critical dimension, known as the cut-off dimension, is equal to the free space wave length of the microwave energy being propagated. However, since the attenuation in a wave guide for a mode of transmission near cutoff is relatively high, the width is preferably made somewhat greater than the wave length. If these slots are of a length of 10% to 12% greater than the wave length of the microwave energy being transmitted, satisfactory results will be obtained.

Generally, the bend radius of guides 38 and 39 must be small enough so that the guides do not project beyond the edges of plate 40. The dimensions of plate 40, in turn, are determined by a compromise between the requirement of minimum aperture blocking and the function of the plate in helping to direct energy at the reflector in order to obtain an optimum sharp pencil beam. It has been found satisfactory to use a bend radius as small as 3/10 of the wave length for wave guides 38 and 39. Similarly, in Fig. 6 the length of steps 41, 42, 43, 44, 45, and 46 has been found to be optimum at approximately 1/10 wave length. The difference in height of the guide for the steps shown in Fig. 6 may be as great as 3/100 of a wave length. The lengths of each step and the change of guide height of each step are interrelated in their effect upon the amplitude and phase of reflected energy from each of the discontinuities, and are adjusted to obtain a negligible net reflection in guides 38 and 39 throughout the band of frequencies propagated for transverse electric modes having both one and two half-wave variations in electric field intensity over the width of the guide. The band of frequencies propagated is narrow relative to the actual center frequency, being 5% to 6% of that frequency. This is a broad range in comparison to other feed devices, however, giving this feed the advantages of interchangeability of frequency determining radar components in the system with which it is used. The height of wave guides 38 and 39 in Fig. 6 depends upon the atmosphere and pressure therein as well as the peak power transmitted, but may safely be as small as 1/10 wave length without danger of breakdown at atmospheric pressure when kilowatt peak power is used. With the proper combination of these dimensions determined experimentally it has been found possible to transmit both the $TE_{01}$ mode and the $TE_{02}$ mode electromagnetic energy, and to successfully match both modes to free space by means of this feed. Since the lengths of the steps and the heights of the guide for each step to produce the net negligible reflection in guides 38 and 39 are critically interrelated it is usually necessary to adjust the dimensions slightly until negligible net reflection is obtained within the guides.

The table below gives examples of critical dimensions of a feed system constructed according to this invention in terms of center wave length $\lambda_0$.

| | |
|---|---|
| Diameter of reflector 22 | $22.2 \lambda_0$ |
| Focal length of reflector 22 | $9.14 \lambda_0$ |
| Distance from matching plate 40 to reflector 22 | $9 \lambda_0$ |
| Width of output slots and guides | $1.114 \lambda_0$ |
| Height of guides 38 and 39 | $0.0995 \lambda_0$ |
| Length of steps 41 and 44 | $0.105 \lambda_0$ |
| Length of steps 42 and 45 | $0.0987 \lambda_0$ |
| Length of steps 43 and 46 | $0.0787 \lambda_0$ |
| Height of guide for steps 41 and 44 | $0.1352 \lambda_0$ |
| Height of guide for steps 42 and 45 | $0.167 \lambda_0$ |
| Height of guide for steps 43 and 46 | $0.207 \lambda_0$ |
| Distance of output slots of steps 43 and 46 from outside surfaces of guides 38 and 39 | $0.0462 \lambda_0$ |

Figure 10:
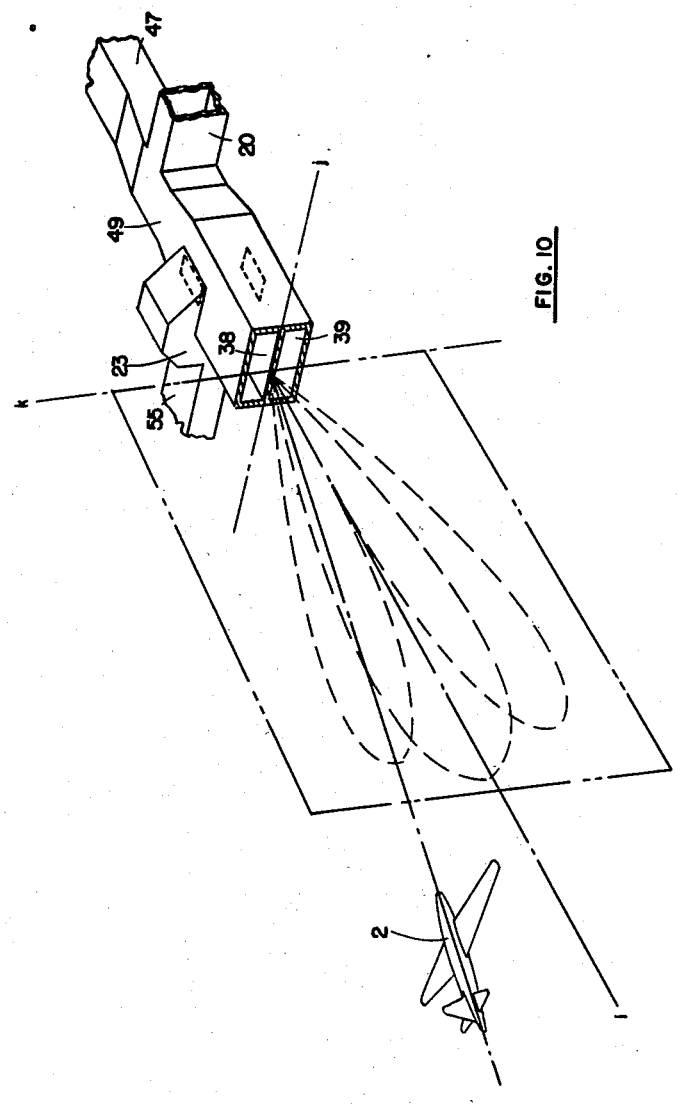
Fig. 10 is a perspective view of the device shown in Fig. 9 with a target displaced in elevation from the principal axis of the antenna.

Referring now to Figs. 9 and 10, the end of wave guide 36 is shown as if cut at plane 9—9 in Fig. 4, radiating a pattern of energy such as could only be obtained by the use of a reflector such as reflector 22 and a feed similar to feed 35. For purposes of simplicity of operation, this feed and the antenna are omitted in Figs. 9 and 10, it being understood that their omission is only for the purpose of facilitating a clear understanding of the function of the parts of the system shown in Figs. 9 and 10. In Fig. 9, energy in the $TE_{01}$ mode is propagated from magnetron 19 through rectangular wave guide section 47, thence through tapered section 48 to rectangular section 49. At 50 the guide is again tapered in the broad direction, and a knife-edge septum is introduced which splits the energy into upper and lower wave guides 38 and 39. Thus, guides 38 and 39 propagate the $TE_{01}$ mode with equal intensity and in phase. By means of the feed and antenna reflector system shown in Figs. 4, 5, 6, 7, and 8 but not shown, for convenience, in Figs. 9 and 10, a lobe 51 is propagated into free space. When the target is exactly on the *i*-axis, each wave of the reflected energy from target 2 arrives back at the end of wave guide sections 38 and 39 at exactly the same instant. The reflected energy, still in $TE_{01}$ mode, is carried back through the microwave transmission system in the same manner as it was sent out, and the time interval between the transmission of a pulse and the reception of its echo indicates the range of the target. However, if the target is off-axis in azimuth, as illustrated in Fig. 9, while the time for the reflected wave to return is still the same and the range indication is therefore the same, the reflected wave is incident upon one side or the other of the two wave guides before reaching the other side. The incident wave therefore excites a complex electromagnetic field in each of wave guides 38 and 39, which wave may be resolved into components which correspond to two different modes of propagation in the wave guide. One component, of course, is the $TE_{01}$ mode. In addition, wave guides 38 and 39 support a second mode—the $TE_{02}$ mode. The $TE_{01}$ mode travels back through the wave guide to section 47 in the same manner as if the target were on-axis. However, the $TE_{02}$ mode cannot be transmitted through tapered wave guide section 52 because the transverse dimension of the guide beyond that point will not support this mode. The $TE_{02}$ mode, it will be recalled, has two half-wave variations of transverse field along the wide dimension, or *j*-axis, in Fig 9. However, the $TE_{02}$ mode is transmitted through slots 53 and 54 in the top and bottom, respectively, of wave guides 38 and 39, because, considering again the condition of the charges on the surfaces of wave guides 38 and 39, an electric field is set up with a direction parallel to the *j*-axis in Fig. 9 on the upper and lower surface, respectively, of wave guides 38 and 39. The $TE_{02}$ mode transmitted by wave guide sections 38 and 39, therefore, is successfully separated out and transmitted through slots 53 and 54 to the side arm 55 of duomode bridge 21. It will be observed that the energy which exists in the $TE_{02}$ mode in wave guide sections 38 and 39 is transmitted as $TE_{01}$ in side arm 55. By a system of phase-comparison, more fully described in connection with Fig. 3, the direction in which the target is off-axis in azimuth can be derived from the information implicit in the energy carried back by wave guide 47.

Referring now to Fig. 10, the situation is presented in which the target is off-axis in elevation. In this case, the reflected energy arrives in wave guide sections 38 and 39 slightly out-of-phase, the amount of phase difference depending upon the extent to which the target is off-axis in elevation. Actually the echo excites in wave guide sections 38 and 39 electromagnetic fields which may each be broken into mutually in-phase and mutually out-of-phase $TE_{01}$ components. In other words, the fields in any cross section of the wave guides can be expressed as the sum of the two in-phase $TE_{01}$ mode waves and two out-of-phase $TE_{01}$ mode waves. The out-of-phase components are separated and are caused to flow through folded wave guide T 20, while the in-phase components proceed through wave guide section 47.

Figure 11:
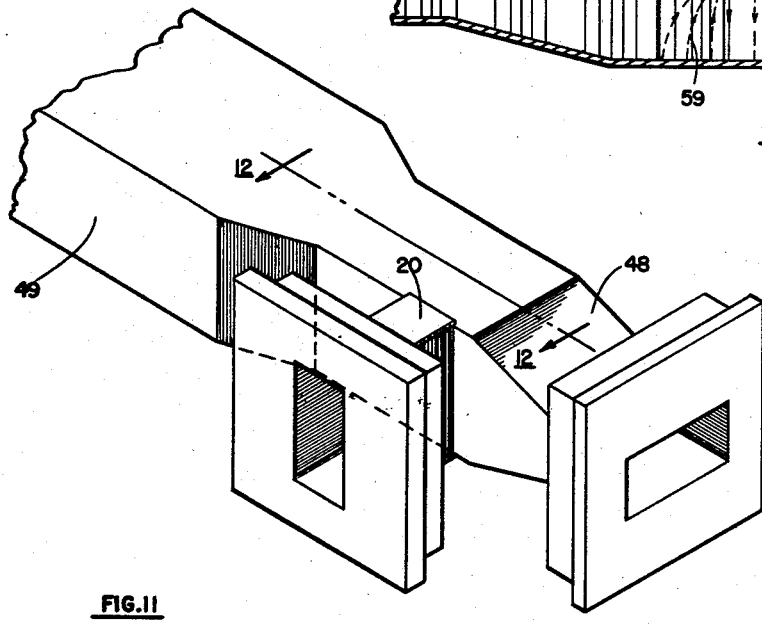
Fig. 11 is a perspective view of a folded wave guide T of a radar used in this invention.
Figure 12:
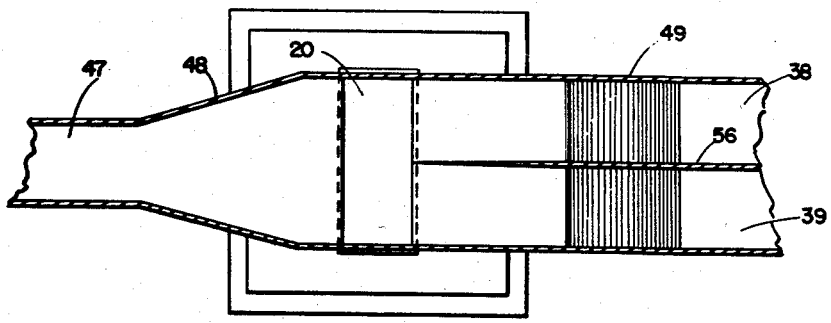
Fig. 12 is a view taken at 12—12 in Fig. 11.

Referring now to Figs. 11 and 12, colinear wave guide 49 comprising upper guide 38 and lower guide 39, separated by septum 56, is shown connected to branching guide 20 which is also a rectangular wave guide. Guides 38 and 39 are joined to tapered section 48 which, in turn, is connected to rectangular guide 47. This configuration is for use in connection with the radar transmission and reception in the X-band, preferably at a frequency at about 9375 mc.

Figure 13:
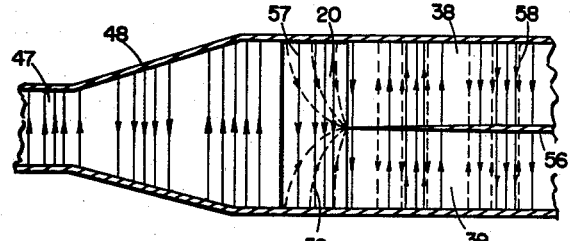
Fig. 13 is a plot of the electric field lines in Fig. 12.

Let it be assumed that transverse electric waves are being propagated through colinear wave guides 38 and 39, from right to left in Figs. 12 and 13. If these waves are exactly in-phase, the direction of the fields may be indicated by the solid arrows in Fig. 13, where the density of the arrows indicates the intensity of the electric fields, and the arrow heads indicate their direction. Where septum 56 ends in Figs. 12 and 13, the mutually in-phase transverse electric waves in the colinear guides merely combine as at 57 in Fig. 13 and will not propagate out branching guide 20, because the transverse dimension thereof is too small to support propagation at this wave length. Assuming now, however, that a complex transverse electric wave which may be resolved into mutually in-phase and mutually out-of-phase components exists in the two colinear guides, the out-of-phase components thereof may be represented by dotted lines as shown at 58 in Fig. 13; and it will be noted that the arrows point in opposite directions in the two guides, indicating that at each point these field lines represent the mutually out-of-phase component of the transverse electric waves. At the end of septum 56, the mutually out-of-phase waves tend to interact and the field lines tend to shorten each other; and the wave will not propagate to the left in Fig. 13. The curved field indicated at 59 is formed, however, and these lines may couple to branching guide 20 which extends normal to the axis of the colinear guides, because in this case the curved field has a component in the horizontal direction of Figs. 2 and 3. The mutually out-of-phase component of the transverse electric waves in the two colinear guides is therefore coupled to branching guide 20 and is taken out of the main wave guide. The mutually in-phase components, however, combine and are transmitted through tapered section 48 and wave guide 47. Tapered section 48 is required to improve the impedance match between rectangular guide 47 and colinear guides 38 and 39. Well-known devices such as irises may of course be used to further improve impedance matches between the colinear guides and the output guides. It will be noted that whether the complex wave propagated in colinear guide 38 leads or lags the transverse electric wave propagated in colinear guide 39 is indicated by the phase relation between the transverse electric waves propagated through branching guide 20 and through rectangular guide 47. If the field lines are direct as indicated at 59, it can be seen that the portion of guide 20 immediately adjacent to the connection will accommodate field lines directed from left to right in Fig. 13. This condition indicates that upper guide 38 leads lower guide 39. When lower guide 39 leads upper guide 38 the arrows at 59 point in the opposite direction, causing the field lines in branching guide 20 to be directed from right to left. Thus the sign of very fine phase differences between the transverse electric waves in guides 38 and 39 may be determined merely by comparing the phase of the transverse electric waves in branching guide 20 with the phase of transverse electric waves in rectangular guide 47 at some remote point by means of the phase-sensitive circuit shown in Fig. 14. Thus, in a manner to be more fully described in connection with Fig. 3, the phase difference between the energy in wave guide T 20 and in wave guide section 47 is compared to give an indication of the direction in which the target is off-axis in elevation. The amplitude of the output of wave guide T 20 is proportional to the displacement of the target off-axis in elevation for small error angles, and the amplitude of the output from error arm 55 is proportional to the error off-axis in azimuth.

Referring now to Fig. 3, the output of folded wave guide T 20 is fed through elevation mixer 24. Elevation mixer 24 also receives the output of local oscillator 60 which is a conventional klystron type oscillator tuned to a frequency near the frequency of the microwave energy reflected from the target, say 30 mc. above or below the magnetron frequency. Mixer 24 therefore produces an output frequency which is the beat frequency or difference frequency between the magnetron frequency and the local oscillator frequency in accordance with superheterodyne principle. This beat frequency may be chosen at an intermediate value of about 30 mc. which frequency may be conveniently amplified in IF amplifier 27. From IF amplifier 27 the signal is fed to phase sensing detector 30 which compares the phase of the output of T 20 with the output derived from wave guide section 47 in Fig. 9.

Figure 14:
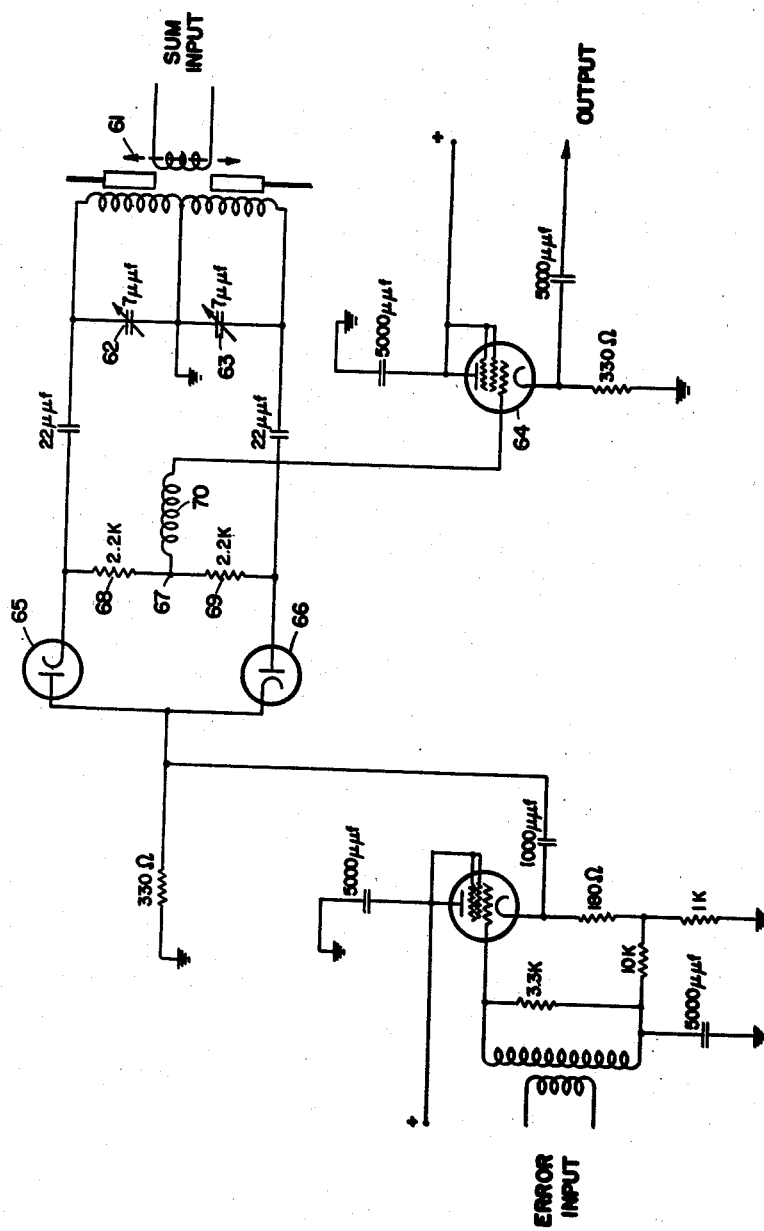
Fig. 14 is a circuit diagram of a phase detector of a radar system used in this invention.

A detailed circuit diagram of phase sensing detector 30 is shown in Fig. 14. There are two intermediate frequency inputs to phase sensing detector 30, one from elevation mixer 24 through IF amplifier 27, and the other from range mixer 26 through IF amplifier 29. The former input is termed the "error" input because it represents the extent to which the target is displaced in elevation from the "line of sight" of the radar antenna. The latter input is termed the "sum" input, since it is derived from the in-phase components of the $TE_{01}$ mode reflection from the target. The sum input is fed through tuned input transformer 61, the two secondary halves of which are individually tuned by means of condensers 62 and 63 to the correct resonant frequency (30 mc. for the circuit shown). As previously revealed, if the error input is in-phase with the sum input, target 2 is displaced in elevation in one direction, and if the error input is out of phase with the sum input the target is displaced in elevation in the opposite direction. The function of the phase detector is to generate at the output a voltage of one polarity if the error input is in phase with the sum input, and a voltage of the opposite polarity if the error input is 180° out of phase with the sum input. Since the output is derived from cathode follower 64, we may look at the input to the grid of cathode follower 64 as the output of the circuit in explaining the function thereof. From Fig. 14 it can be seen that if there is no error input, the voltage on the grid of triode 64 will be zero, since the currents of diodes 65 and 66 contribute equally and oppositely to the voltage at point 67 where resistors 68 and 69 and RF choke 70 are joined. However, if the error input is in phase with the sum input, current through one of the diodes will be increased, while the current through the other diode will be decreased. The opposite situation will obtain when the error input is 180° out of phase with the sum input, so that if the error input is in phase with the sum input, a voltage of one polarity appears at the output, while the opposite voltage appears if the error input is 180° out of phase with the sum input. In this way the sense of the error, i.e., the direction in which the target is off-axis in elevation with respect to the antenna, is given by the polarity of the output voltage.

The sense of the error in azimuth is detected by phase sensing detector 31, and the direction in which the target is off-axis in azimuth is revealed by the polarity of the output voltage of phase sensing detector 31 by means of a circuit similar to that shown in Fig. 14.

Figure 15:
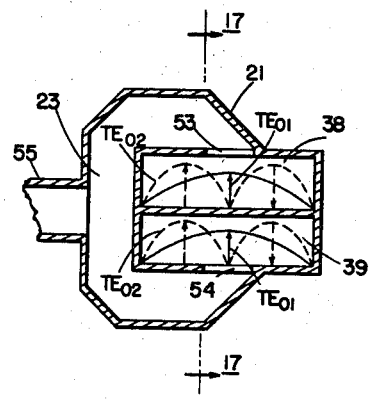
Figs. 15 and 16 are section views taken at 15—15 in Fig. 9.
Figure 16:
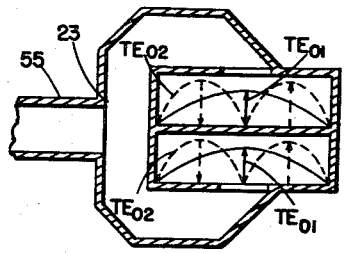

Referring now to Fig. 15, which is a sectional view taken where duomode bridge 21 is attached to wave guide sections 38 and 39, the relative transverse electric field strength is plotted as a function of wave guide transverse dimension as it would appear when the target is off-axis in azimuth. When the target is off-axis in azimuth the electromagnetic waves are propagated within each section of the guide in two modes. The fundamental or dominant mode is the $TE_{01}$ mode and is so designated in Fig. 15. The secondary mode is the $TE_{02}$ mode and is plotted in dotted lines in Fig. 15. It will be observed that two half-wave variations in transverse field exist along the long cross-sectional dimension of the guide, and that the fields are oppositely directed and reach maxima at the two quarter points of the long cross-sectional dimension of the guide. The function of the duomode bridge is to couple out of the main guide all electromagnetic waves in the $TE_{02}$ mode. This is accomplished by exciting in the side arms of the bridge electromagnetic waves of the $TE_{01}$ mode by means of slots 53 and 54. When the target is off-axis in azimuth to the left, the condition of the fields may be assumed to be as represented in Fig. 15. In this case the resultant $TE_{01}$ mode transmission through the side arm of the bridge may be assumed to be "in-phase" with the $TE_{01}$ mode electromagnetic waves being propagated through the main guide. Whether the $TE_{01}$ mode electromagnetic waves transmitted through the side arm are, indeed, in phase with the $TE_{01}$ electromagnetic waves transmitted through the main guide will, of course, depend upon the relative path lengths from the feed to the point of phase comparison, i.e., the phase sensing detector, but it may be assumed in general that the relative path lengths may be varied somewhat in order to assure that this result will be obtained. If this assumption is correct, and then if the target is displaced off-axis in azimuth by a similar amount to the right, the condition of the fields within the guide may be represented as shown in Fig. 16. It will be observed that the $TE_{02}$ fields have merely been reversed in sense in Fig. 16 from what they were in Fig. 15. Hence, for the same path lengths and other relevant parameters the $TE_{01}$ mode electromagnetic waves propagated in the side arm of the guide will be 180° out-of-phase with the $TE_{01}$ electromagnetic waves propagated through the main guide. Therefore, the same phase detector circuit may be employed in phase sensing detector 31 as in phase sensing detector 30, and the sign of output voltage of phase sensing detector 31 indicates the direction in which the target is off-axis in azimuth. Phase sensing detectors 30 and 31 therefore yield signals proportional to the amounts by which a target whose echo has been detected is off-axis in elevation and azimuth, respectively, for small error angles. The directions in which the target is off-axis in elevation and azimuth are indicated by the signs of the outputs of phase sensing detectors 30 and 31, respectively. If the target is not off-axis in azimuth or elevation, phase sensing detectors 30 and 31 yield no output. If it is off-axis in azimuth or in elevation, the outputs of phase sensing detectors 30 and 31 are used to train antenna reflector 22 so that the reflector points directly to the target. The means by which these training operations may be accomplished is more fully described below. The training means described below cooperates with the microwave and electronic portion of the radar to form a servo loop, i.e., so long as the outputs of the phase sensing detectors indicate that the target is off-axis, the antenna reflector continues to be actuated in the sense required to reduce the output of the phase sensing detectors until a null point is reached. Thereafter, antenna reflecter 22 remains virtually fixed upon the target and tracks the target automatically.

The signal from detector 32 yields range information in accordance with conventional radar theory. The function of detector 32 is to generate a signal indicative of the time between the transmission of a pulse by magnetron 19 and the reception of an echo from the target. This time is directly proportional to the range of the target;

hence the output of detector 32 is an indication of range. Any one of a number of detector circuits for such time measurement, all well known to the radar art, may be employed for this purpose.

Figure 17:
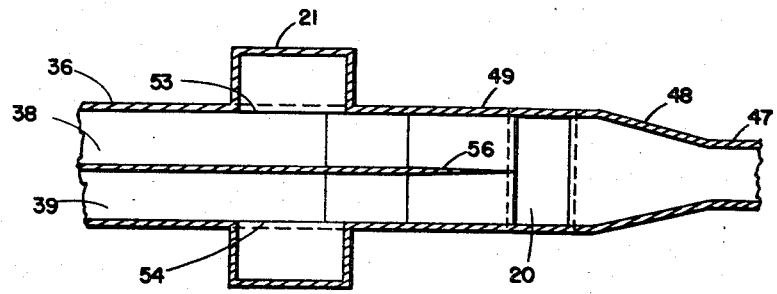
Fig. 17 is a view taken at 17—17 in Fig. 15.

The manner in which the in-phase $TE_{01}$ mode electromagnetic waves reflected from the target are separated from $TE_{01}$ mode waves mutually out-of-phase is also illustrated by reference to Fig. 17 which is a longitudinal sectional view through the wave guide. As disclosed above, the reflected wave undergoes mode separation first, i.e., the $TE_{02}$ mode waves are coupled out of the guide by means of slots 53 and 54 and excite in the side arms of duomode bridge 21 electromagnetic waves in the $TE_{01}$ mode. Then the reflected wave proceeds back through the guide to folded wave guide T 20 where electromagnetic waves which are mutually out-of-phase are coupled out by T 20. Where septum 56 terminates and the double guide becomes a single guide, propagation of the $TE_{01}$ mode in mutually out-of-phase components ends, and beyond this point only in-phase $TE_{01}$ waves are propagated through the single guide. These $TE_{01}$ mode waves are fed to detector 32 and used to determine range to the target. The out-of-phase $TE_{01}$ mode waves are propagated through T 20 to mixer 24.

Means and apparatus for training a beam of radiant energy from reflector 22 to track target 2 automatically requires two types of motion to keep the beam trained on the target. The first is an oscillatory motion of restricted amplitude centered on the target and required to generate signals adequate to servo the apparatus to the target. The second is a less rapid motion of greater amplitude required to train on the target and to keep the radar pointed in the general vicinity of the target. The first motion requires that the radar antenna be oscillated about a point very close to the reflector itself. It can therefore be seen that the support scheme for the radar antenna must also be adequate to support oscillating means for the antenna and other related heavy mechanical and electrical equipment. The second motion, though generally of slower speed, needs to be of great amplitude and must be adapted to handle a relatively large mass.

The space requirements for a radar support scheme dictate that the radar's "view" be unobstructed throughout the expected angular range of the device. In addition, if the radar is to be used in an aircraft expected to travel at high speed, the mounting device must be so devised as to minimize the size and weight of the overall installation.

Figure 18:
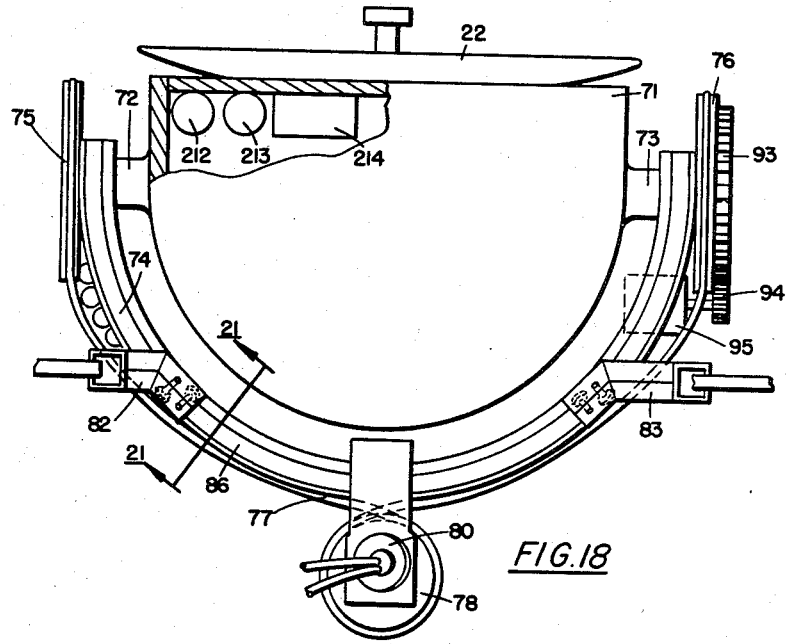
Fig. 18 is a plan view of the training mechanism for a radar used in this invention.
Figure 21:
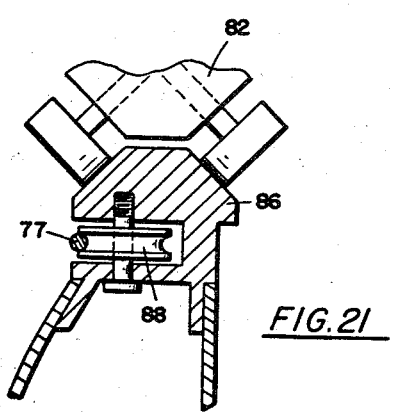
Fig. 21 is a view, partly in section, taken at 21—21 in Fig. 18.

Referring now to Fig. 18, a radar antenna 22 and spheroidal eyeball-shaped case 71 containing an antenna oscillating mechanism and other electrical microwave components set forth in Figs. 1 through 17 are mounted on stub shafts 72 and 73 supported rotatably on a drum 74 having the shape of a segment of a cylinder and rotatable by means of pulleys 75 and 76 drivingly attached to shafts 72 and 73 outside drum 74. Pulley 75 is attached directly to shaft 72 while pulley 76 drives shaft 73 through a reversing gear train to be disclosed. A continuous cable 77 is wound around and attached to pulleys 75 and 76 and around windlasses 78 and 79 rigidly mounted in interceptor 3 and rotatable independently by means of hydraulic motors 80 and 81. Drum 74 is supported in interceptor 3 on roller brackets 82, 83, 84, and 85 which engage tracks 86 and 87 secured to the ends of drum 74 and shown in detail in Fig. 21. Cable 77 slides along drum 74 in fair-leads 88 shown in detail in Fig. 21, but, for clarity, omitted in the other figures. Partial gear 89 rigidly attached to drum 74 engages gear 90 adapted to rotate angular pick-off 91 supported in frame 92 which is attached to the structure of interceptor 3, and supports hydraulic motors 80 and 81. Pick-off 91 is an azimuth pick-off whose electrical output indicates the azimuth angle through which the drum has been rotated. Rate gyroscopes 212, 213, and 214, whose input axes are mutually perpendicular, are attached to case 71 to measure the angular rates of antenna 22.

Figure 20:
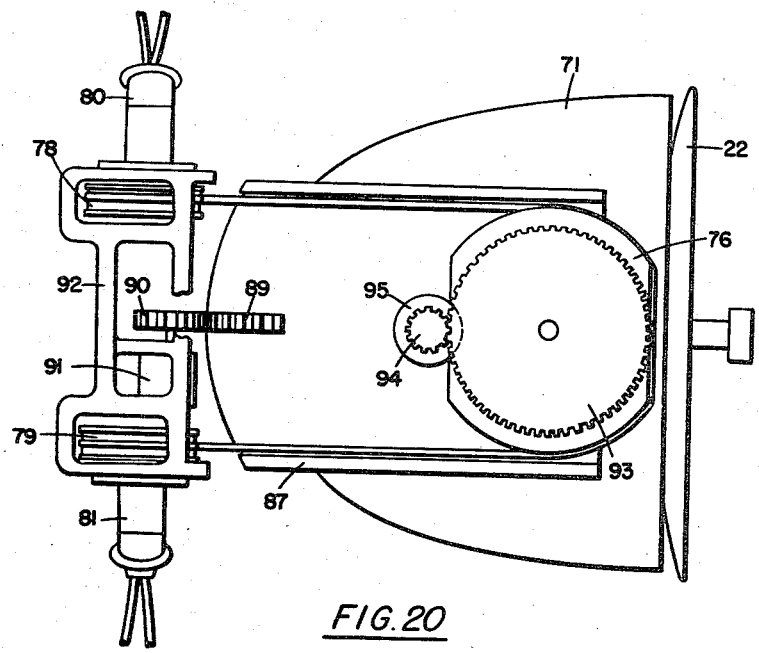
Fig. 20 is a side view of the training mechanism for a radar used in this invention.

Referring to Fig. 20, gear 93 is attached to pulley 76 and, by means of gear 94, drives elevation pick-off 95 which, by its output, indicates the angle of elevation through which stub shafts 72 and 73 have been turned. Pulleys 75 and 76 are connected by stub shafts 72 and 73, case 71 and gears 96, 97, 98, and 99, which constitute a reversing gear train for a purpose to be hereinafter disclosed.

Figure 19:
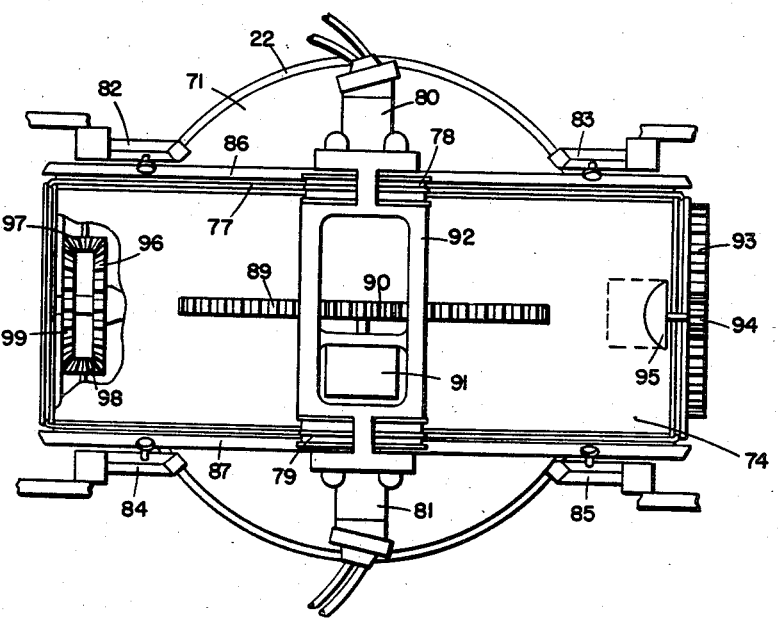
Fig. 19 is an elevation view of the training mechanism for a radar used in this invention.
Figure 22:
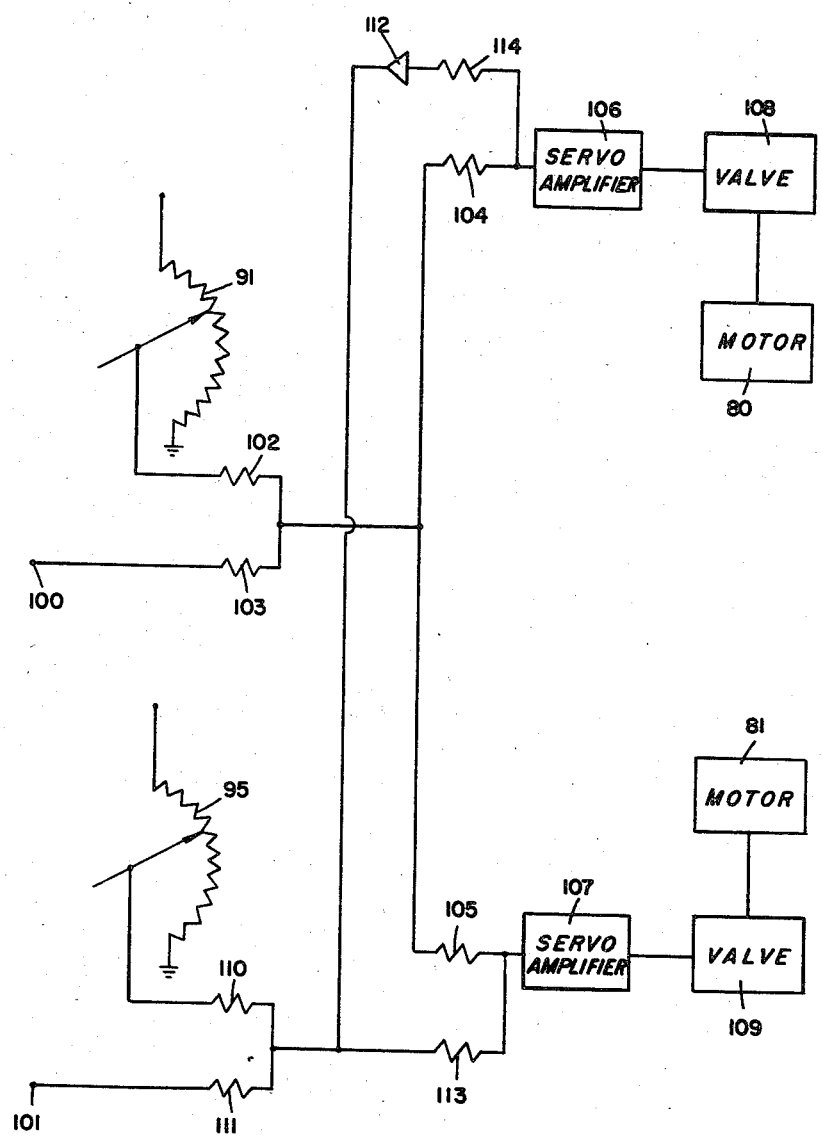
Fig. 22 is a circuit diagram of the servo follow-up of the training mechanism of a radar used in this invention.

Operation of the invention may be best understood by reference to Fig. 22 taken in connection with the other figures. Let it be assumed that the existing orientation of antenna 22 and case 71 differs from that which is desired. Electrical signals proportional to the desired azimuth and desired elevation are introduced at terminals 100 and 101, respectively. Simultaneously, signals proportional to the actual azimuth and elevation are derived from azimuth pick-off 91 and elevation pick-off 95. It has been assumed that the desired azimuth differs from the actual azimuth. Therefore, if the polarities of the desired azimuth signal and the actual azimuth signal are opposed, a net signal corresponding in sign to the larger of the two input signals is apparent where resistances 102 and 103 join. This signal is fed through resistances 104 and 105 to amplifiers 106 and 107 which control valves 108 and 109 connected to hydraulic lines which, in turn, control hydraulic motors 80 and 81. In a similar manner, the difference signal between the actual and desired elevation is apparent where resistances 110 and 111 join, and this signal is fed through inverting amplifier 112 and resistances 113 and 114 to servo amplifiers 106 and 107. Note that the motion of motors 80 and 81 is proportional to the algebraic sum of the signals received from the elevation circuit and the signals received from the azimuth circuit. Motors 80 and 81, as is apparent from Figs. 18, 19, and 20, drive windlasses 78 and 79 in the direction required to train, elevate or depress antenna 22 and case 71 in response to the electrical circuit shown in Fig. 22. If motors 80 and 81 turn in the same direction at the same speed, it can be seen that the net motion of antenna 22 is merely a change in azimuth. However, if motors 80 and 81 are operated in opposite directions, but at the same speed, it can be seen that the result is a pure elevation change in the attitude of antenna 22. To combine an elevation and azimuth change it is only necessary to vary the speed and direction of hydraulic motors 80 and 81. Gears 96, 97, 98, and 99, constituting a reversing gear train, are provided so that pulley 75 will always rotate in an opposite direction from pulley 76. This expedient eliminates the possibility of cable 77 piling up on one side or the other of the windlasses. Gears 97 and 98 are rotatable on stub shafts secured to drum 74, while gear 96 is rigidly attached to stub shaft 72. Gear 99 turns with pulley 75 which is rotatable on drum 74 independently of stub shaft 72.

There is thus provided means for mounting a radar antenna is an aircraft in combination with electrical means for rotating said radar antenna in azimuth and elevation through any combination of angles. If the device is situated in the nose of the aircraft, case 71 containing the antenna oscillating mechanism may be very conveniently and compactly fitted within drum 74. The absence of large bending moments and cantilever sections makes the device structurally efficient, and any angle of elevation or azimuth may be obtained quickly by the simple application of the proper electrical signals, as shown in Fig. 22.

Thus a radar system is provided together with means for training and positioning the radar to track target 2. The outputs from the radar system described herein are used, as will be disclosed hereafter together with the fire control computer, autopilot, and in combination with the entire fire and flight control system.

Flight data computer

The flight data computer of this invention measures the weight W or mass $m$ of interceptor 3, measures the stagnation temperature of the air, $T_0$ measures the static pressure $P_s$, and measures the difference in pressure $\Delta P$ between the ram and static pressure. The measured parameters are operated upon by computer mechanisms, to be described hereinafter, to provide shaft rotations which are proportional to the Mach number M, true air speed $V_T$, differential pressure $\Delta P$ and static pressure $P_s$ of interceptor 3, and to provide electrical voltages which are proportional to the air density ratio $\rho/\rho_0$, angle of attack $\alpha$, and angle of skid $\beta$. $\rho_0$ is defined in paragraph 6–06 of Eshbach Handbook of Engineering Fundamentals, first edition, John Wiley & Sons, 1936.

The $x$, $y$, and $z$ axes of interceptor 3 are defined in accordance with the NACA standards shown on the back of the inside cover of NACA Report 420 entitled "Aircraft Speed Instruments," published by the Superintendent of Documents, 1941.

Figure 23:
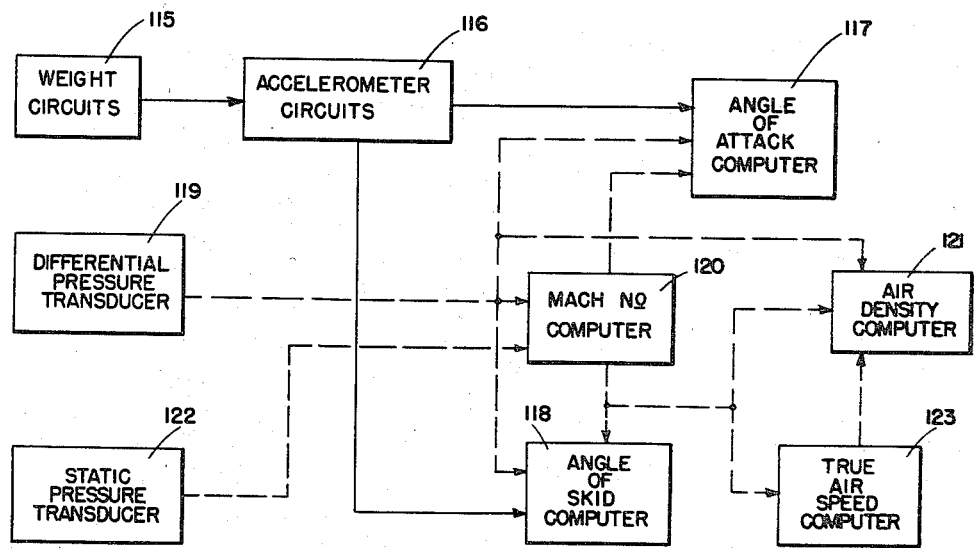
Fig. 23 is a block diagram of the flight data computer of this invention.

In Fig. 23, weight circuits 115 are connected to accelerometer circuits 116. The $z$ axis accelerometer of accelerometer circuits 116 is located forward of the center of gravity of the interceptor by a distance $\delta$ equal to an average moment of inertia $I_y$ of the interceptor about its $y$ axis through its center of gravity, divided by a quantity equal to a predetermined averaged mass, $m'$ of interceptor 3, multiplied by an average distance $r$ from the center of gravity of the interceptor to the center of pressure of the interceptor horizontal tail surface $$\delta = \frac{I_y}{m'r}$$

The $y$ axis accelerometer of accelerometer circuits 116 is located forward of the center of gravity of the interceptor by a distance $$\delta' = \frac{I_z}{m'r'}$$

wherein $I_z$ is an average moment of inertia of interceptor 3 about its $z$ axis through its center of gravity, and $r'$ is an average distance from the center of gravity of the interceptor to the center of pressure of the vertical tail surface of the interceptor. The electrical voltage outputs of accelerometer circuits 116 are proportional to the accelerations of the interceptor in the direction of the $z$ axis and in the direction of the $y$ axis of the interceptor measured at the locations of the $z$ axis and $y$ axis accelerometers, respectively, multiplied by the total weight of the aircraft or $W\eta_z'$ and $W\eta_y'$. (The prime indicates that the acceleration force sensed is not caused by pure translational acceleration.) The electrical outputs of accelerometer circuits 116 are connected to the input of angle of attack computer 117 and angle of skid computer 118. Differential pressure transducer 119 provides a shaft rotation which is proportional to $\Delta P$ as measured by a conventional Pitot tube (not shown). The mechanical output of differential pressure transducer 119 is connected to the input of angle of attack computer 117, angle of skid computer 118, Mach number computer 120, and air density computer 121. Static pressure transducer 122 produces a shaft rotation which is proportional to $P_s$. The mechanical output of static pressure transducer 122 is connected to the input of Mach number computer 120. Mach number computer 120 produces a shaft rotation which is proportional to the Mach number M at which the interceptor is operating. Mach number computer 120 solves the equation $$M = \sqrt{\frac{2}{\gamma-1}} \sqrt{\left(1+\frac{\Delta P}{P_s}\right)^{\frac{\gamma-1}{\gamma}} - 1}$$

where $\gamma$ is a constant which is equal to 1.4 for air. The mechanical output of Mach number computer 120 is connected to the input of angle of attack computer 117, angle of skid computer 118, air density computer 121, and true airspeed computer 123. True airspeed computer 123 solves the equation $$V_T^2 = cT_0\left(\frac{M^2}{1+0.2M^2}\right)$$

wherein $c$ is a known constant, and $T_0$ is the stagnation temperature. The output of true airspeed computer 123 is a shaft rotation which is proportional to the true airspeed and is connected to the input of air density computer 121. Air density computer 121 solves the equation $$\frac{\rho}{\rho_0} = \frac{2\Delta P}{V_T^2 f_4(M)}$$

wherein $f_4(M)$ is the compressibility factor:

$$f_4(M) = 1 + \frac{M^2}{4} + \frac{M^4}{40} + \cdots$$

Air density computer 121 provides an electrical voltage output which is proportional to $\rho/\rho_0$. Angle of attack computer 117 solves the equation $$\alpha = \frac{W\eta_z'}{S\Delta P} f_1(M) + \alpha_0(M) + W\eta_z' f_2(M)$$

wherein $\alpha_0(M)$ is the angle of attack for zero lift and zero moment, S is a constant proportional to the wing area of interceptor 3, $f_1(M)$ is the compressibility factor, $f_4(M)$, divided by the slope of the lift characteristic curve for interceptor 3, $$\frac{f_4(M)}{C_{L\alpha}}$$

and $f_3(M)$ is an empirical function which takes into account the aeroelastic characteristics of the wing. Angle of attack computer 117 provides a voltage output which is proportional to $\alpha$ for small angles of $\alpha$, for example less than fifteen degrees. Angle of skid computer 118 solves the equation $$\beta = \frac{W\eta_y'}{S\Delta P} f_2(M)$$

wherein $f_2(M)$ is an empirically determined function which is similar to $f_1(M)$ and is predetermined for the particular interceptor upon which the computer is to be mounted. The output of angle of skid computer 118 is a voltage output which is proportional to $\beta$.

Figure 24:
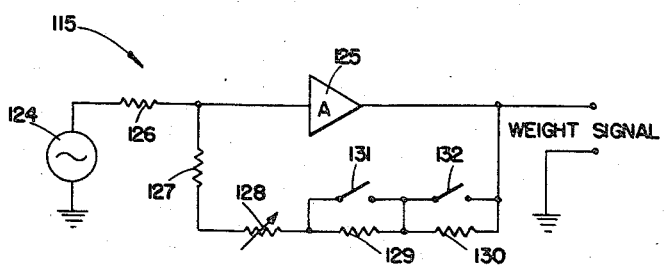
Fig. 24 is a schematic drawing of the weight circuits of the flight data computer of this invention.

In the weight circuits of Fig. 24, voltage source 124 is connected to the input of amplifier 125 through resistor 126. The resistance of the feedback loop of amplifier 125 is varied by resistors 127, 128, 129, and 130. The resistance of resistor 127 is fixed in accordance with the empty weight of the interceptor. The resistance of resistor 128 is controlled by, for example, the amount of fuel in the tanks of the interceptor. Resistors 129 and 130 are shorted by means of switches 131 and 132 when the rockets are fired. The output from amplifier 125 is proportional to the total weight of the interceptor and its load.

Figure 25:
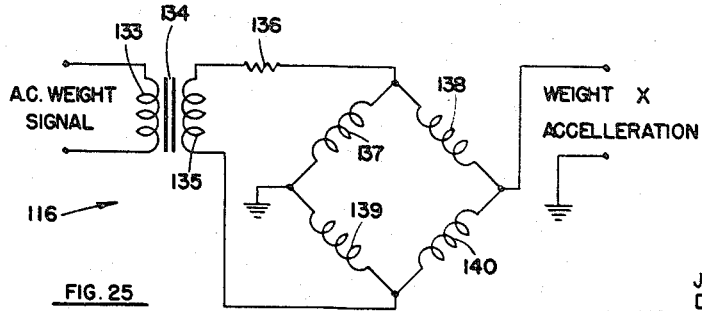
Fig. 25 is a schematic drawing of a typical accelerometer circuit used in the flight data computer of this invention.

In Fig. 25, a typical accelerometer is shown. A voltage from amplifier 125, shown in Fig. 24, is applied to primary winding 133 of transformer 134. The voltage from winding 135 is applied through resistor 136 to opposite terminals of the inductance bridge comprising inductors 137, 138, 139, and 140. Accelerations in the sensitive direction of the accelerometer cause, for example, the inductance of inductor 138 and of inductor 139 to increase, while it causes the inductance of inductors 137 and 140 to decrease, whereby a voltage is generated whose amplitude is proportional to the weight of the entire interceptor multiplied by the acceleration of the interceptor in the sensitive direction of the accelerometer.

Differential pressure transducer 119 and static pressure transducer 122 are of the type set forth in patent application Serial No. 266,374, filed January 14, 1952, in the names of David G. Soergel and Frederick H. Gardner, for "Closed-Cycle Pressure Transducer," now U.S. Patent No. 2,751,576. The closed-cycle transducer described herein operates on a normal force balance principle. This means that the output of the transducer is no longer dependent on the amount of displacement of the pressure sensitive element, but depends on a balancing of two forces to maintain the element in its balanced or zero position. One of these forces is produced in the pressure sensitive element by the input pressure. The other force is produced by a system of feedback from the output.

A null detector, which might be of the variable capacitor or inductive "E" pick-off type, is employed to detect any departure of the pressure sensitive element from its normal balanced position. When the element is unbalanced, a signal is sent from the null detector network to an amplifier circuit which actuates a torquing device, such as an electromagnetic torquer or motor. The torquing device moves, due to the amplifier output current, as long as the null detector indicates an unbalanced condition. Part of the output of the torquing device is fed back to the pressure sensitive element as a correcting factor. When the feedback is sufficient to restore the force balance, the torquing device ceases to move. The desired variation of the current, voltage, resistance inductance, or shaft rotation output is obtained from the output of the torquing device or is obtained from the output of the amplifier circuit, since the amplifier output current must be sufficient to maintain the required torque in the electromagnetic torquing device or motor.

Referring to Fig. 26 and to the sectioned view shown in Fig. 27, the desired output is a variation of resistance in potentiometers 141 and 142 which is proportional to the difference in the pressures supplied at fittings 143 and 144. Casing 145, Bourdon tube assembly 146, and plate assembly 147 enclose a pressure-sealed chamber consisting of interconnected chambers 148, 149, and 150. All external electrical connections to the transducer are made through terminals 151 of pressure-sealed socket 152. Fitting 144 is provided in plate assembly 147 to provide a port whereby any desired pressure is impressed in chambers 148, 149, and 150, and hence one side of Bourdon tube 153. Fitting 143 is provided to Bourdon tube assembly 146 to provide means for exerting input pressure to the other side of the Bourdon tube 153 or to evacuate that side if a static pressure input is desired.

Torsional straight line Bourdon tube 153 is sensitive to changes in the pressure differential between fittings 143 and 144. The movable or torque end of Bourdon tube 153 is rigidly connected to armature 154 of null detector 155. Feedback shaft 156 is also attached to armature 154. Torsional spring assembly 157, consisting of straight-line torsional spring 158 secured to spring collars 159 and 160, transmits torque to feedback shaft 156 by means of shaft slot 161 and pin 162. Slot 161 permits axial motion of the torsional devices while transmitting all torque.

Normally the torque of torsional spring 157 is equal and opposed to the torque of Bourdon tube 153, and armature 154 is in a balanced or zero position. A change in the pressure differential upsets this balanced torque position. The unbalanced torque causes balanced armature 154 to rotate about the center line of Bourdon tube 153. Rotation of armature 154 unbalances the null detector 155. Null detector 155 is an inductive "E" pick-off type consisting of a stator and armature 154. When unbalanced, the null detector 155 sends an error signal out through terminals 151 to power amplifier 163. In response to the error signal, power amplifier 163 furnishes power to motor 164. The direction of rotation of motor 164 depends on the phase of the detector error signal. Motor 164 drives gear train 165. Output shafts of gear train 165 include the shafts of potentiometers 141 and 142. The shaft of either potentiometer 141 or 142 can be extended in length to drive any number of resistors or potentiometers. A further output shaft of gear train 165 is feedback drive shaft 166. Torsional spring collar 160 is secured to feedback drive shaft 166 by taper pin 167. Feedback drive shaft 166 is driven in such a direction as to cause torsional spring 158 to exert a torque on balanced armature 154, tending to return armature 154 to its zero balanced position.

As the forces tend toward balance, the null detector 155 output voltage decreases until a state of equilibrium is established wherein the residual voltage output of the null detector is just sufficient to maintain the required amplifier 163 current which produces the balancing torque required to maintain the state of equilibrium. Motor 164 ceases to run. The output shafts of potentiometers 141 and 142 being geared to motor 164 have turned through an angle which is proportional to change in pressure. Detail 168 is a spring stop device to prevent damage to the follow-up spring 158.

The device used in the example described above for obtaining shaft rotation proportional to pressure operates on the principle of maintaining zero deflection of the movable end of Bourdon tube 153. Only a small amount of deflection starts the feedback torque cancelling out the deflection. Thus, the amplitude of deflections is kept very small. Since the magnitude of the hysteresis error of the device depends on the amplitude of deflections from zero position, the hysteresis error is negligible.

In differential pressure transducer 119, ram pressure is introduced at fitting 143 and static pressure is introduced at fitting 144. In static pressure transducer 122, static pressure is introduced at fitting 144, and the chamber at which fitting 143 is attached is evacuated and sealed off. In each case the rotation of shaft 166 is a measure of the pressure differential between fittings 143 and 144.

Mach number computer 120 is shown in Fig. 28. Voltage from voltage source 169 is applied across a Wheatstone bridge comprising resistors 170, 171, 172, and 173. Variable resistor 170 is mechanically driven by static pressure transducer 122 so that the resistance of resistor 170 is proportional to the static pressure. Resistor 171 is driven by differential pressure transducer 119 so that the resistance of resistor 171 is proportional to the difference between ram and static pressure. Resistor 172 is a nonlinear variable resistor which is connected to be driven by motor 174. Motor 174 is driven by amplifier 175 which is connected across the output of the Wheatstone bridge of resistors 170, 171, 172, and 173. The nonlinearity of the resistance of resistor 172 is adjusted to null the bridge when the shaft rotation of motor 174 is proportional to the Mach number of the aircraft.

Figure 29:
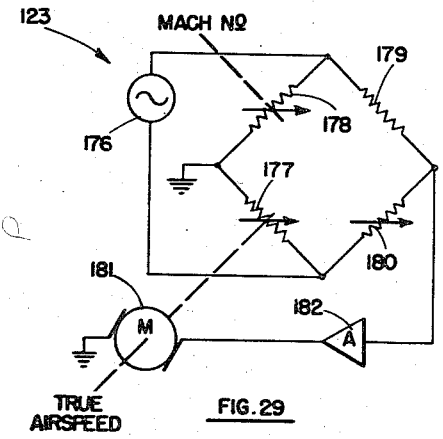
Fig. 29 is a schematic drawing of a true air speed computer.

True airspeed computer 123 is shown in Fig. 29. Voltage source 176 is applied across the input of a Wheatstone bridge comprising resistors 177, 178, 179, and 180. The resistance of resistor 180 is proportional to the stagnation temperature of the air. Variable resistor 178 is mechanically driven by Mach number computer 120 so that the resistance of resistor 178 is a predetermined function of the Mach number. Amplifier 182 is connected across the output of the Wheatstone bridge of resistors 177, 178, 179, and 180 to drive motor 181 with a shaft rotation which is proportional to the true air speed. The nonlinear resistance of nonlinear resistor 177 is predetermined to cause the shaft rotation of motor 181 to be proportional to $V_T$.

Figure 30:
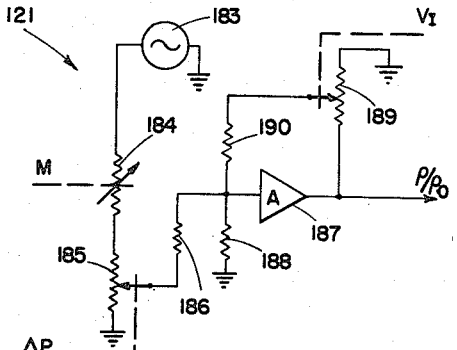
Fig. 30 is a schematic drawing of an air density computer.

Air density computer 121 is shown in Fig. 30. Voltage source 183 is connected across variable resistor 184 and potentiometer 185. The shaft of resistor 184 is driven by Mach number computer 120. The shaft of potentiometer 185 is driven by differential pressure transducer 119. The movable arm of potentiometer 185 is connected through resistor 186 to the input of amplifier 187. Resistor 188 is connected between the input of amplifier 187 and the ground terminal. Potentiometer 189 is connected across the output of amplifier 187. The shaft of potentiometer 189 is driven by true air speed computer 123. Potentiometer 189 has a voltage upon its movable arm which varies as the square of true airspeed. The movable arm of potentiometer 189 is connected through resistor 190 to the input of amplifier 187, thus effectively dividing the output of amplifier 187 by the square of true air speed. The output of amplifier 187 is proportional to the air density ratio, $\rho/\rho_0$.

Figure 31:
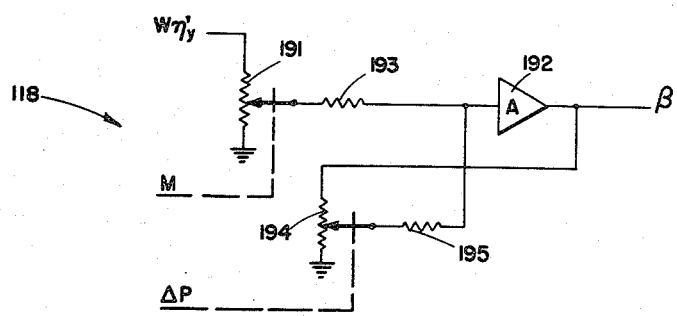
Fig. 31 is a schematic drawing of an angle of skid computer.

Angle of skid computer 118 is shown in Fig. 31. A voltage proportional to $W\eta_y'$ is applied from accelerometer circuits 116 across potentiometer 191. Potentiometer 191 is mechanically driven by Mach number computer 120 in accordance with the Mach number. The nonlinearity of the resistance of potentiometer 191 is predetermined to provide a voltage output upon its movable arm which is proportional to $W\eta_y'f_2(M)$. The movable arm of potentiometer 191 is connected through resistor 193 to the input of amplifier 192. The output of amplifier 192 is connected across potentiometer 194. The movable arm of potentiometer 194 is driven by differential pressure transducer 119. The movable arm of potentiometer 194 is connected through resistor 195 to the input of amplifier 192. The feedback circuit about amplifier 192, comprising potentiometer 194 and resistor 195, divides $W\eta_y'f'(M)$ by a constant S and by $\Delta P$. The resultant output of amplifier 192 is proportional to the angle of skid $$\beta = \frac{W\eta_y'f_2(M)}{S\Delta P}$$

Figure 32:
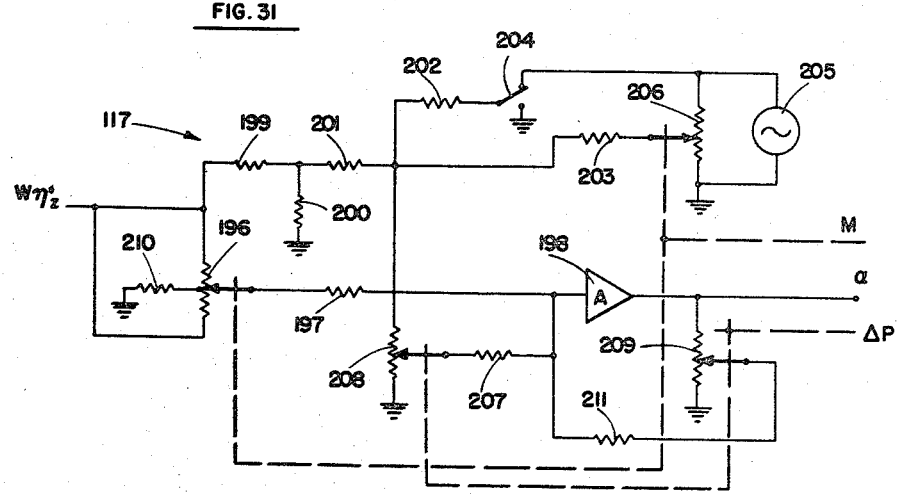
Fig. 32 is a schematic drawing of an angle of attack computer.

Angle of attack computer 117 is shown in Fig. 32. A voltage proportional to $W\eta_z'$ is applied to both ends of nonlinear potentiometer 196. Resistor 210 is connected to a tap on potentiometer 196 and to ground. The movable arms of potentiometer 196 is driven by Mach number computer 120. The voltage upon the movable arm of potentiometer 196 is connected to the input of amplifier 198 through resistor 197 and is proportional to $W\eta_z f_1(M)$. The voltage which is proportional to $W\eta_z'$ is connected across resistors 199 and 200 in series. The junction between resistors 199 and 200 is connected to the terminal of resistor 201. The other terminal of resistor 201 is connected to potentiometer 208. This voltage is proportional to $W\eta_z'f_3(M)$ wherein $f_3(M)$ is taken as a constant. Voltage source 205 is connected across potentiometer 206. The movable arm of potentiometer 206 is driven by Mach number computer 120. The voltage upon the movable arm of potentiometer 206 is proportional to a function $\alpha_0(M)$. The movable arm of potentiometer 206 is connected through resistor 203 to potentiometer 208. Voltage source 205 is connected to one terminal of switch 204. Switch 204 is up or down depending upon whether the flaps of interceptor 3 are up or down. When the flaps are down, voltage source 205 is connected to resistor 202. When the flaps are up, resistor 202 is connected to ground. Thus, when the flaps are down, a voltage of a predetermined value is connected to potentiometer 208, while when the flaps are up, a zero voltage is connected through resistor 202 to potentiometer 208. Thus, the voltage across potentiometer 208 is proportional to $W\eta_z'f_3(M)+\alpha_0(M)+K_\alpha$ wherein $K_\alpha$ is the voltage contributed from resistor 202. The movable arm of potentiometer 208 is driven by differential pressure transducer 119. The movable arm of potentiometer 208 is connected through resistor 207 to the input of amplifier 198. This voltage is proportional to $$W\eta_z'\Delta P f_3(M)+\Delta P\alpha_0(M)+\Delta P K_\alpha$$

Therefore, the entire voltage input to amplifier 198 is proportional to $$W\eta_z'f_1(M)+W\eta_z' P f_3(M)+\Delta P\alpha_0(M)+\Delta P K_\alpha$$

The output of amplifier 198 is connected across potentiometer 209. The movable arm of potentiometer 209 is driven by differential pressure transducer 119. The movable arm of potentiometer 209 is connected through resistor 211 to the input of amplifier 198 thereby dividing the input voltage of amplifier 198 by $\Delta P$. Hence, the output voltage of amplifier 198 is proportional to $$\alpha = \frac{W\eta_z'f_1(M)}{S\Delta P}+W\eta_z'f_3(M)+\alpha_0(M)+K_\alpha$$

Fire control computer

Fire control computer 4 is a course computing means which is connected to autopilot 6 to supply pitch aiming error signals and yaw aiming error signals whereby autopilot 6 controls and causes interceptor 3 to follow a lead pursuit or lead collision course toward target 2. Fire control computer 4 is also a weapon firing computer means which is connected to firing circuits 8 to supply a signal to firing circuits 8 which causes firing circuits 8 to initiate the firing of rockets 10.

The vector equation which must be continuously solved to predict future target position with respect to interceptor 3 is $$\bar{R}_K = \bar{R}+\bar{V}_B T$$

Figure 33:
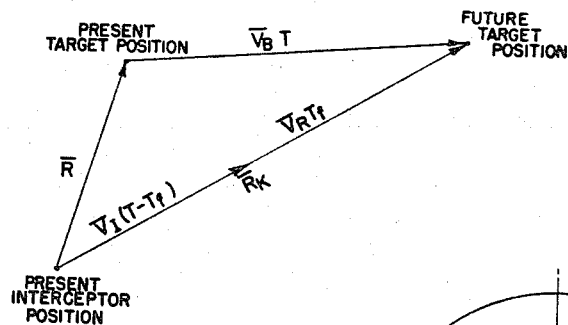
Fig. 33 is a vector diagram of the relative position of the interceptor and target.

The vector relation between $\bar{R}_K$, $\bar{V}_B T$, and $\bar{R}$ is illustrated in Fig. 33. The kinematic range vector $\bar{R}_K$ is a vector from the present interceptor position to the position of the target at the time the target is hit, hereinafter designated as the future target position. The present range vector $\bar{R}$ is the vector from the present interceptor position to the present target position. $\bar{V}_B$ is the velocity of the target. T is the total time required for interceptor 3 to reach the rocket launching point plus the time of flight, $T_f$, of the rockets. The velocity of interceptor 3 is $\bar{V}_I$ and the average velocity of the rockets is $\bar{V}_R$.

It is more convenient to mechanize the vector $$\frac{\bar{R}_K}{T}$$

than to mechanize the vector $\bar{R}_K$.

$$\frac{\bar{R}_K}{T} = \frac{\bar{R}}{T}+\bar{V}_B$$

Figure 34:
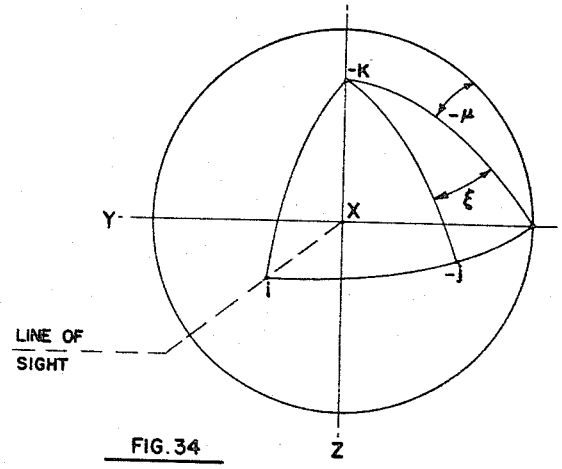
Fig. 34 is a unit spere diagram of the relation between the interceptor coordinates and the radar antenna coordinates.

Rate gyroscopes 212, 213, and 214 shown in Fig. 18 on radar antenna 22 are electrically connected to fire control computer 4. Radar antenna 22 is gimballed as illustrated in Fig. 34. The matrix relating the radar and interceptor coordinate systems is

|   | x | y | z |
|---|---|---|---|
| i | cos $\xi$ cos $\mu$ | sin $\xi$ cos $\xi$ | −sin $\mu$ cos $\xi$ |
| j | −sin $\xi$ cos $\mu$ | cos $\xi$ | sin $\xi$ sin $\mu$ |
| k | sin $\mu$ | 0 | cos $\mu$ |

In this matrix, the roll, pitch and azimuth axes of the interceptor coordinate system are the x, y, and z axes, respectively. The i, j, and k axes of the radar system have the i axis along the line of sight between interceptor 3 and target 2. $\xi$ is the azimuth gimbal angle and $\mu$ is the elevation gimbal angle. Rate gyroscopes 212, 213, and 214 are connected to detect the angular velocity of the antenna system about the i, j, and k axes, respectively. The electrical signals transferred from rate gyroscopes 212, 213, and 214 to fire control computer 4 are proportional to these angular velocities which are designated herein $\omega_i$, $\omega_j$, and $\omega_k$, respectively. Fire control computer 4 solves for the components of target velocity in the radar coordinate system.

Because the radar positions itself on target 2, the range is always along the line of sight or i axis. Consequently, $$\bar{R} = Ri$$

where $i$ represents a unit vector along the $i$ axis. The target velocity vector $\bar{V}_B$ is given by $$\bar{V}_B = \dot{\bar{R}} + \bar{V}_I$$

where $\bar{V}_I$ is the interceptor velocity and $$\dot{\bar{R}} = \dot{R}i + (\omega \times \bar{R})$$

The angular velocity $\bar{\omega}$ of the radar coordinate system is expressed as $$\bar{\omega} = \omega_i \bar{i} + \omega_j \bar{j} + \omega_k \bar{k}$$

Consequently the components of $\dot{\bar{R}}$ are $$\dot{\bar{R}} = \dot{R}\bar{i} + R\omega_k \bar{j} - R\omega_j \bar{k}$$

The components of the interceptor velocity vector, expressed in $x$, $y$, $z$ coordinates, are approximated very closely by $$\bar{V}_I = V_I \bar{x} + V_I \beta \bar{y} + V_I \alpha \bar{z}$$

in which $\bar{x}$, $\bar{y}$, and $\bar{z}$ are unit vectors in the direction of the $x$, $y$, and $z$ axes, respectively. This equation assumes that $\alpha$ and $\beta$ are relatively small and are therefore approximately equal to $\sin \alpha$ and $\sin \beta$, respectively. The $\bar{V}_I$ components are then transformed into the radar coordinate system.

$$\bar{V}_I = V_I[\cos \xi \cos \mu + \beta \sin \xi - \alpha \sin \mu \cos \xi]\bar{i}$$
$$+ V_I[-\sin \xi \cos \mu + \beta \cos \xi + \alpha \sin \xi \sin \mu]\bar{j}$$
$$+ V_I[\sin \mu + \alpha \cos \mu]\bar{k}$$

The $\bar{V}_B$ components are obtained by adding the respective component terms of $\dot{\bar{R}}$ and $\bar{V}_I$. These $\bar{V}_B$ component terms are noisy due to radar tracking noise and are filtered by means of a vector filter system, explained below in connection with Fig. 37, and which is set forth in application Serial No. 233,388, filed June 25, 1951, in the name of Rulon G. Shelley.

Figure 35:
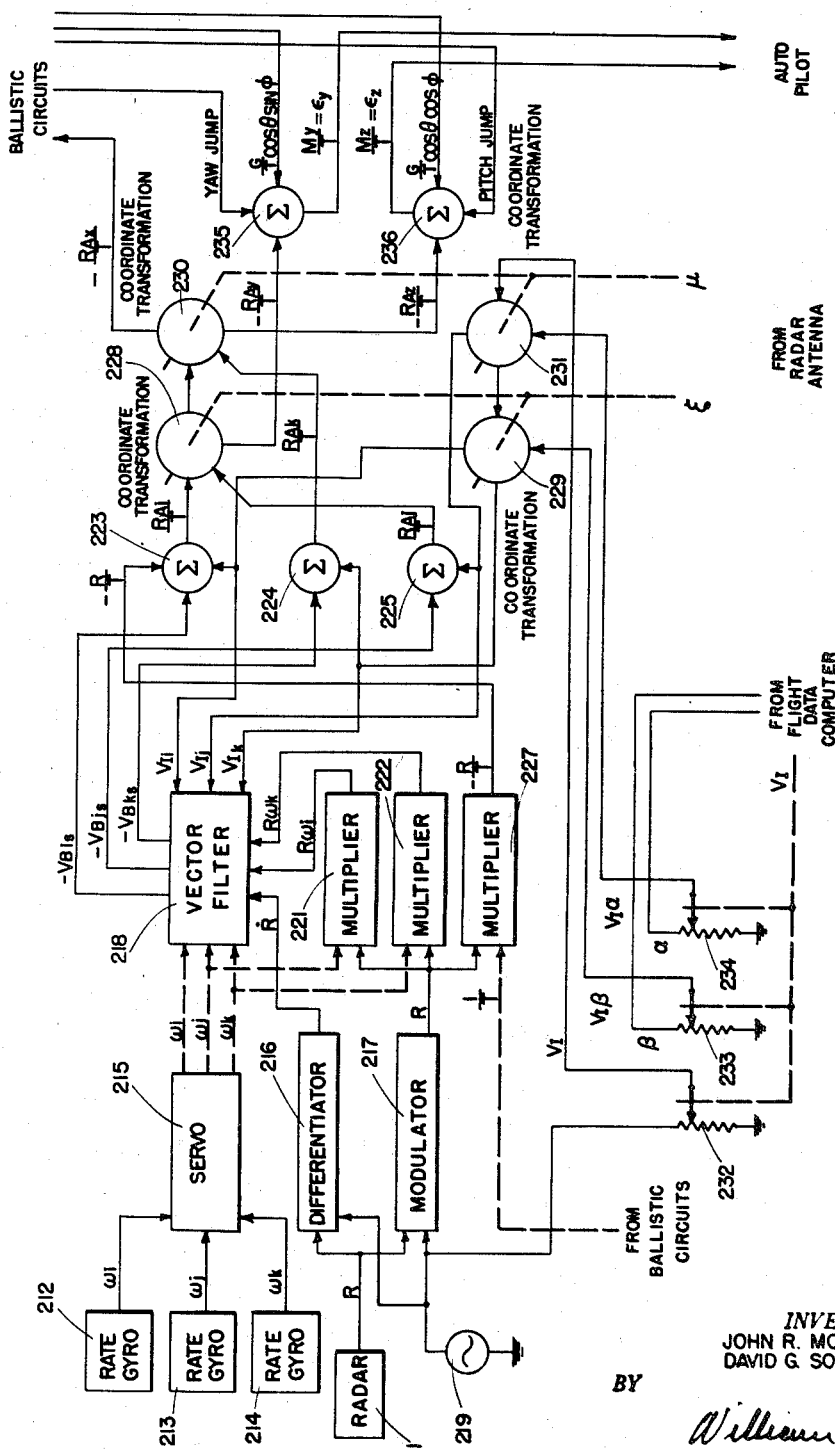
Fig. 35 is a block diagram of the prediction circuits of the fire control computer.

In Fig. 35, the electrical outputs of rate gyroscopes 212, 213, and 214 are connected to servo 215 where shaft rotations proportional to $\omega_i$, $\omega_j$, and $\omega_k$ are generated. A voltage proportional to the range, R, between interceptor 3 and target 2 is generated by detector 19 of radar 1. The output of detector 19 is connected to the input of differentiator 216 and modulator 217. The input of differentiator 216 is differentiated to provide an output which is proportional to $\dot{R}$. Alternating current voltage source 219 is connected to the input of modulator 217 and to the input of differentiator 216 to provide an output from modulator 217 which has an alternating current carrier and whose amplitude is proportional to R. In the figures and following description, alternating current voltages may be used provided the minus voltages are opposite in phase to the plus voltages. The output of differentiator 216 is connected to the input to vector filter 218. The output of modulator 217 is connected to the inputs of multipliers 227, 221, and 222. The mechanical input to multiplier 227 is connected to time-until-hit servo 226, to be described presently in connection with Figs. 36 and 39. The electrical output of multiplier 227 is connected to the input of summing amplifier 223 and is proportional to $$-\frac{R}{T}$$

The mechanical input to multiplier 221 is connected to the $\omega_j$ mechanical output of servo 215. The electrical output of multiplier 221 is connected to the electrical input of vector filter 218 and is proportional to $R\omega_j$. The mechanical input to multiplier 222 is the $\omega_k$ mechanical output of servo amplifier 215. The electrical output of multiplier 222 is connected to vector filter 218 and is proportional to $R\omega_k$. The mechanical inputs to vector filter 218 are connected to the $\omega_i$, $\omega_j$, and $\omega_k$ mechanical outputs of servo 215. Resolvers 228 and 229 are mechanically driven by the shaft of azimuth pick-off 91. Resolvers 230 and 231 are mechanically driven by the shaft of elevation pick-off 95. Potentiometers 232, 233, and 234 are mechanically connected to true air speed computer 123 and have a mechanical input proportional to $V_I$. The electrical input to potentiometer 232 is connected to alternating current voltage source 219. The electrical input to potentiometer 233 is connected to the electrical output of angle of skid computer 118. The electrical input to potentiometer 234 is electrically connected to angle of attack computer 117. The electrical output of potentiometer 232 is proportional to $V_I$. The electrical output of potentiometer 233 is proportional to $V_I \beta$. The electrical output of potentiometer 234 is proportional to $V_I \alpha$. The electrical output of potentiometer 232 is connected to the electrical input of resolver 231. The electrical output of potentiometer 233 is connected to the electrical input of resolver 229. The electrical output of potentiometer 234 is connected to the electrical input of resolver 231. One electrical output of resolver 231 is connected to the electrical input of resolver 229. The other electrical output of resolver 231 is proportional to $V_{Ij}$. The electrical outputs of resolver 229 are proportional to $V_{Ii}$ and $V_{Ik}$. The electrical outputs $V_{Ij}$ of resolver 231 and $V_{Ii}$ and $V_{Ik}$ of resolver 229 are connected to the electrical input of vector filter 218. The electrical output $V_{Ij}$ of resolver 231 is connected to the electrical input of summing amplifier 225. The electrical output $V_{Ii}$ of resolver 229 is connected to the electrical input of summing amplifier 223, and the electrical output $V_{Ik}$ of resolver 229 is connected to the electrical input of summing amplifier 224. The outputs of vector filter 218 are designated $-V_{Bis}$, $-V_{Bjs}$ and $-V_{Bks}$. The "s" indicates that they are smoothed outputs. The outputs of vector filter 218 are connected to the electrical inputs of summing amplifiers 223, 224, and 225. Advance range, $R_A$, is defined herein as the vector from interceptor 3 to target 2 at the time of impact of the rocket or projectile. The electrical output of summing amplifier 223 is connected to the electrical input of resolver 228 and is proportional to $$\frac{R_{Ai}}{T}$$

The electrical output of summing amplifier 224 is connected to the electrical input of resolver 230 and is proportional to $$\frac{R_{Ak}}{T}$$

The electrical output of summing amplifier 225 is connected to the electrical input of resolver 228 and is proportional to $$\frac{R_{Aj}}{T}$$

Figure 36:
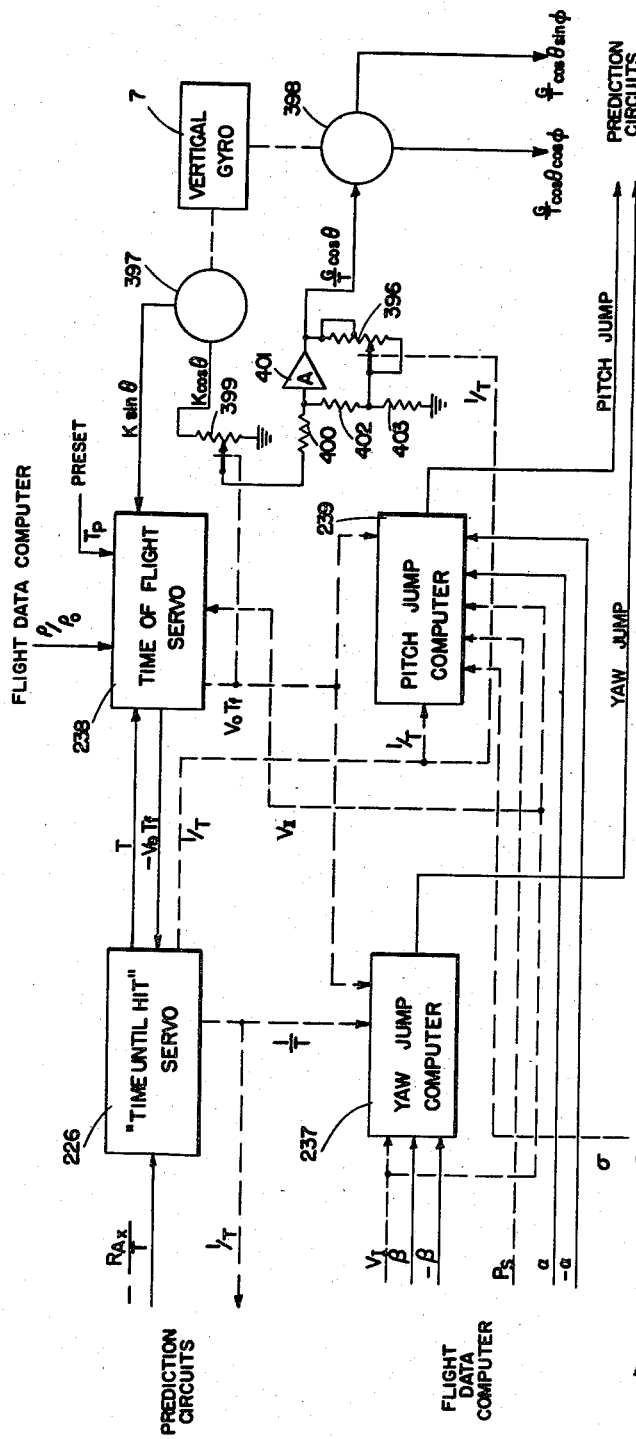
Fig. 36 is a block diagram of the ballistic circuits of the fire control computer.

One electrical output of resolver 228 is connected to the electrical input of resolver 230. The electrical output of resolver 228 which is proportional to $$\frac{R_{Ay}}{T}$$

is connected to the electrical input of summing amplifier 235. The electrical output of resolver 230 which is proportional to $$\frac{R_{Az}}{T}$$

is connected to the electrical input of summing amplifier 236. The electrical output of resolver 230 which is proportional to $$\frac{R_{Ax}}{T}$$

is connected to the electrical input of time-until-hit servo 226 as shown in Fig. 36.

In Fig. 36 time-until-hit servo 226 continuously computes the predicted time until target 2 is struck by the projectiles from the weapon. The output of time-until-hit servo 226 is a mechanical shaft rotation which is proportional to $$\frac{1}{T}$$

Time-of-flight servo 238 continuously computes the time of flight of the rockets and the distance between interceptor 3 and target 2 at the time of impact. The output of time-of-flight servo 238 is a shaft rotation which is proportional to $V_0T_f$ and voltages which are proportional to $-T_f$ and $-V_0T_f$, wherein $\bar{V}_0 = \bar{V}_K - \bar{V}_I$. Yaw jump computer 237 continuously computes a correction to compensate for angular reorientation of the rocket about the yaw axis after it leaves interceptor 3. Yaw jump computer 237 does not compensate for gravity forces upon the rocket. Pitch jump computer 239 continuously computes a correction to compensate for angular reorientation of the rocket about the pitch axis after it leaves interceptor 3. Pitch jump computer 239 does not, however, compensate for gravity drop. Time-until-hit servo 226 continuously receives a voltage proportional to $$-\frac{R_{AX}}{T}$$

from resolver 230 shown in Fig. 35. Time-until-hit servo 226 also receives a voltage proportional to $-V_0T_f$ from time-of-flight servo 238. The output shaft rotation of time-until-hit servo 226 which is proportional to $$\frac{1}{T}$$

is connected to the input of pitch jump computer 239, yaw jump computer 237, multiplier 227 in Fig. 35 and the movable arm of variable resistor 396. Time-of-flight servo 238 receives an electrical signal proportional to $K \sin \theta$ from resolver 397 which is connected to vertical gyro 7 to measure the angle of pitch $\theta$. In this equation K is an arbitrary constant. Other electrical inputs to time-of-flight servo 238 are a voltage proportional to $T_p$, which is the average temperature of the propellant of the rockets, and a voltage proportional to $\rho/\rho_0$ from air density computer 121. Output shaft rotation of time-of-flight servo 238 proportional to $V_0T_f$ is connected to the input of yaw jump computer 237, pitch jump computer 239 and potentiometer 399. Besides the mechanical shaft rotation inputs previously mentioned, yaw jump computer 237 has a shaft rotation input proportional to $V_I$ and voltage input proportional to $\beta$ and $-\beta$ from flight data computer 5. The output of yaw jump computer 237 is connected to the input of summing amplifier 235 shown in Fig. 35. Besides the mechanical shaft rotation inputs previously mentioned, pitch jump computer 239 has mechanical shaft rotation inputs proportional to $P_s$ and $V_I$ and voltage inputs proportional to $\alpha$ and $-\alpha$ from flight data computer 5 and an input proportional to rocket pod angle $\sigma$. The output of pitch jump computer 239 is connected to the input of resolver 236 shown in Fig. 35. Resolver 397 is shaft connected to vertical gyro 7 to measure the pitch angle $\theta$ of interceptor 3 and to provide electrical output signals which are equal to $K \sin \theta$ and $K \cos \theta$. The signal which is proportional to $K \sin \theta$ is connected to the input of time-of-flight servo 238. The output of resolver 397 which is proportional to $K \cos \theta$ is connected across potentiometer 399. The movable arm of potentiometer 399 is mechanically driven by the output of time-of-flight servo 238. The movable arm of potentiometer 399 is electrically connected to one terminal of resistor 400. The other terminal of resistor 400 is connected to the input of amplifier 401, and to one terminal of resistor 402. The second terminal of resistor 402 is connected to one terminal of resistor 403 and to the movable arm of variable resistor 396. The second terminal of resistor 396 is connected to its movable arm. The second terminal of resistor 403 is connected to ground. The output of amplifier 401 is connected to variable resistor 396 and is connected to electrically excite resolver 398 and is proportional to $$\frac{G}{T} \cos \theta$$

in which G is proportional to the drop of a rocket projectile due to the force of gravity. Resolver 398 is mechanically connected to vertical gyro 7 to measure the roll angle $\phi$ and to provide electrical outputs which are proportional to $$\frac{G}{T} \cos \theta \cos \phi \text{ and } \frac{G}{T} \cos \theta \sin \phi$$

The electrical output which is proportional to $$\frac{G}{T} \cos \theta \cos \phi$$

is connected to the input of summing amplifier 236 shown in Fig. 35. The electrical output which is proportional to $$\frac{G}{T} \cos \theta \sin \phi$$

is connected to the electrical input of resolver 235, in Fig. 35.

Figure 37:
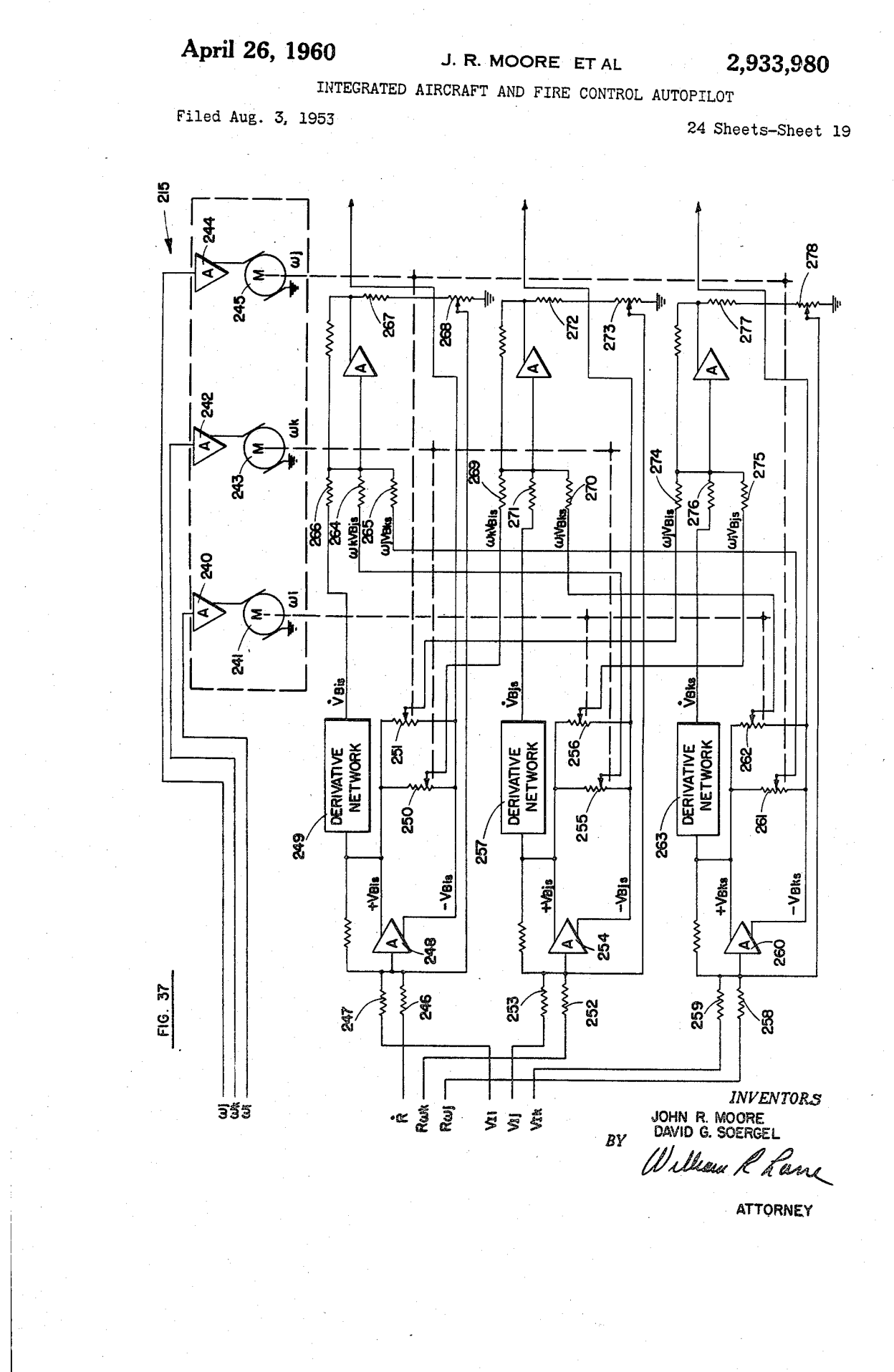

Due to limitations inherent in the radar system, and the transmission and reception of radar signals, the signal developed by the radar has in it spurious variations called "noise" which must be reduced or filtered out. In the example under consideration the coordinate system in which the range vector to the target is measured is not fixed in space, but is rotating, since the radar apparatus used to measure the target velocity vector is, in general, rotating and translating in space. Consequently a simple derivative feedback filter would yield a component of feedback due solely to rotation of the coordinate system of the radar. This is an undesirable result, since it would introduce possibly worse errors than the noise it would eliminate. A vector filter is used in this invention to smooth the target velocity vector in a manner equivalent to smoothing in a nonrotating coordinate system, without transforming the vector from one coordinate system to the other. The target velocity vector is recognized as a true vector quantity with direction as well as magnitude. In Fig. 37, voltages proportional to $\omega_i$, $\omega_j$, and $\omega_k$ are connected to the input of servo 215. The $\omega_i$ voltage is connected to amplifier 240 which drives servo motor 241 with a shaft rotation precisely proportional to $\omega_i$. The $\omega_k$ input is connected to amplifier 242 which drives servo motor 243 with a shaft rotation which is precisely proportional to $\omega_k$. The $\omega_j$ input is connected to amplifier 244 which drives servo motor 245 with a shaft rotation which is precisely proportional to $\omega_j$. The electrical outputs of resolvers 229 and 231 are $V_{Ii}$, $V_{Ij}$, and $V_{Ik}$ which are the components of velocity of interceptor 3 along the $i$, $j$, and $k$ axes of the radar coordinate system. When these components are combined vectorially they yield the interceptor velocity vector. Thus, radar 1 yields voltages which, when combined, vectorially yield the target velocity vector relative to interceptor 3, and resolvers 229 and 231 yield voltages which, when combined vectorially, yield the interceptor velocity vector with respect to a nonrotating coordinate system. When these vectors are added the resultant is the target velocity with respect to inertial space. This vector is useful for computing the fire control problems of interceptor 3. However, it is desirable that the voltages representative of the absolute velocity of target 2 be smoothed or filtered to reduce noise. In Fig. 37, a voltage proportional to $\dot{R}$ is added through resistor 246 to a voltage proportional to $V_{Ii}$ through resistor 247 to the input of amplifier 248, the output of which, is a voltage $V_{Bis}$ proportional to the component of target velocity along the $i$ axis. Amplifier 248 is so arranged that both a positive and negative voltage proportional to $V_{Bis}$ are generated as the outputs thereof. This voltage is fed to derivative network 249 which yields an output voltage proportional to $\dot{V}_{Bis}$. The positive and negative outputs of amplifier 248 are connected to the opposite posts of potentiometer 250 and potentiometer 251, the wipers of which are shaft connected to servo motors 243 and 245 so that they are turned to positions proportional to $\omega_k$ and $\omega_j$. The output of these potentiometers is therefore proportional to $\omega_k V_{BI}$ and $\omega_j V_{BI}$, respectively.

In a similar manner a voltage proportional to $R\omega_k$ from radar 1 is connected through resistor 252, and a voltage proportional to $V_{Ij}$ is connected through resistor 253 to the input of amplifier 254, the outputs of which are then $+V_{Bjs}$ and $-V_{Bjs}$, which outputs are connected to the terminals of potentiometers 255 and 256, the wipers of which are turned to positions proportional to the angular rates $\omega_k$ and $\omega_l$. The output of amplifier 254 is also connected to derivative network 257 which yields an output proportional to $\dot{V}_{Bjs}$.

Finally, a voltage from radar 1 proportional to $R\omega_j$ is connected through resistor 258, and a voltage proportional to $V_{Ik}$ is connected through resistor 259 to the input of amplifier 260 whose output voltages are then $+V_{Bks}$ and $-V_{Bks}$ which outputs are connected to the terminals of potentiometers 261 and 262 whose wipers are turned to positions proportional to the angular rates $\omega_j$ and $\omega_i$, respectively. The outputs of these potentiometers are then proportional to $\omega_j V_{Bks}$ and $\omega_i V_{Bks}$, respectively. A voltage proportional to $V_{Bks}$ is also fed to derivative network 263 whose output is then a voltage proportional to $\dot{V}_{Bks}$.

The outputs of potentiometers 255 and 261, being $\omega_k V_{Bjs}$ and $\omega_j V_{Bks}$, respectively, are added to the output of derivative network 249 through resistors 264, 265 and 266, respectively. The combined voltage is then fed through resistor 267 and potentiometer 268, back to the input of amplifier 248. The subscript "s" above indicates that the term to which it is applied is a smoothed quantity. This smoothing is effected by the feedback process which is described so that derivative network 249, and the derivative networks to be described, actually operate upon a smoothed velocity component.

Similarly, the outputs of potentiometers 250 and 262, being $\omega_k V_{Bls}$ and $\omega_i V_{Bks}$, respectively, are added to the voltage output of derivative network 257 through resistors 269, 270, and 271, and fed to resistor 272 and potentiometer 273 and thence to the input of amplifier 254.

Finally, the outputs of potentiometers 251 and 256, being voltages proportional to $\omega_j V_{Bls}$ and $\omega_i V_{Bjs}$, are added to the voltage output of derivative network 263 through resistors 274, 275, and 276 and thence fed through resistor 277 and potentiometer 278 to the input of amplifier 260.

To appreciate what is accomplished by the circuitry just discussed it is helpful to consider the mathematical operations which have been performed. Briefly, what has been accomplished is that the target velocity vector has been smoothed by introducing a feedback term proportional to the true vector derivatives of the smoothed target velocity. The vector derivative of smoothed target velocity has been split into components along $i$, $j$, and $k$ axes, respectively, and as such may be represented as the sum of various scalar quantities as indicated in the following equations:

$$\dot{V}_{Bis} = \dot{V}_{Bis} + \omega_j V_{Bks} - \omega_k V_{Bjs}$$
$$\dot{V}_{Bjs} = \dot{V}_{Bjs} + \omega_k V_{Bis} - \omega_i V_{Bks}$$
$$\dot{V}_{Bks} = \dot{V}_{Bks} + \omega_i V_{Bjs} - \omega_j V_{Bis}$$

Since the true vector derivative has been taken rather than a mere scalar derivative, true filtering of the target velocity vector has been accomplished. More complete smoothing may of course be accomplished by extending the theory to second and third derivatives with feedback to the inputs of amplifiers 248, 254, and 260.

Figure 38:
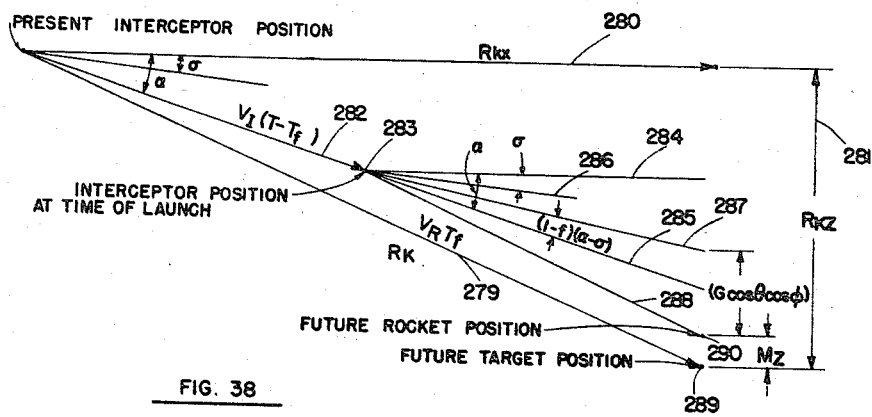
Fig. 38 is a diagram which shows the relative position of the interceptor and the target.

The geometry which is used to determine the pitch error signal for a lead collision course is illustrated in Fig. 38. The angles are exaggerated in this diagram. In Fig. 38, the present interceptor position is shown at the left of the figure where the lines converge. The $x$ direction which is along the roll axis of the interceptor is shown by the top horizontal line. A projection of the kinematic range vector $R_k$ is shown by vector 279. The component of $R_k$ in the $x$ direction, $R_{kx}$, is shown by vector 280. The component of $R_k$ in the $z$ direction of the interceptor, $R_{kz}$, is shown by line 281. The direction of the interceptor velocity, $V_I$, is along vector 282 which differs in direction from the $x$ direction by the angle of attack $\alpha$. At point 283 along the path of the interceptor, the $x$ axis is represented by line 284. The direction of motion of interceptor 3 is represented by line 285 which differs from line 284 by the angle of attack $\alpha$. Line 286 represents the direction along which rockets are launched from interceptor 3. Line 286 differs from line 284 by an angle $\sigma$, which is the angle the rocket launching pad makes with the $x$ axis. The quantity $f$, which is called the launching factor, is a function of air static pressure, $P_s$, interceptor velocity, $V_I$, and propellant temperature, $T_p$. For the small variations of propellant temperature expected, the effect of propellant temperature upon the value of $f$ can be neglected. When a rocket is launched it is initially pointed in the direction of line 286 but tends to align itself with the air stream along line 285. The amount by which the heading of the rocket varies to align the rocket with the direction of line 285 is a fraction $f$ of the difference between the angles of $\alpha$ and $\sigma$. Thus, if there were no gravity effects upon the rocket, the rocket would proceed along the path shown by line 287. However, gravity causes the rocket to drop farther to line 288, which is a distance proportional to $$G \cos \theta \cos \phi$$

The target position at the time the rocket should have hit is at point 289, but the rocket position is at 290. The difference between point 289 and 290 is the miss distance $M_z$. $M_z$ is made as small as possible so that the target is hit by the rockets.

Figure 39:
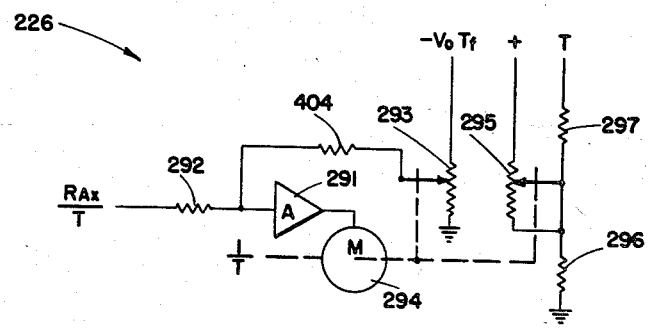
Fig. 39 is a schematic drawing of a time-until-hit servo.

Time-until-hit servo 226 is shown more particularly in Fig. 39. In Fig. 39 the input to servo amplifier 291 is connected through resistor 292 to resolver 230 shown more particularly in Fig. 35. A voltage proportional to $-V_0T_f$ is connected from time-of-flight servo 238 to one terminal of potentiometer 293. Potentiometer 293 is mechanically driven by servo motor 294 which is electrically connected to the output of servo amplifier 291. The voltage upon the movable arm of potentiometer 293 is proportional to $-V_0T_f$ times the shaft rotation of motor 294. This arm is connected through resistor 404 to the input of servo amplifier 291. When the shaft rotation of motor 294 is precisely proportional to $$\frac{1}{T}$$

$R_{Ax} = V_0 T_f$. As a matter of fact $V_0 T_f$ differs from $R_{Ax}$ by only a small error signal which is inherent in the operation of a servo loop. Hence the shaft rotation of motor 294 is proportional to $$\frac{1}{T}$$

Potentiometer 295 has one terminal connected to a positive voltage. The other terminal of potentiometer 295 is connected to the movable arm of potentiometer 295 and to one terminal of resistor 296. The other terminal of resistor 296 is connected to the ground terminal. Potentiometer 295 is mechanically connected to servo motor 294 and is driven thereby. The voltage upon the movable arm of potentiometer 295 is proportional to the reciprocal of the shaft rotation of motor 294 and is therefore proportional to $T$. The movable arm of potentiometer 295 is connected to resistor 297. The output terminal of resistor 297 therefore has a voltage upon it which is proportional to T.

Figure 40:
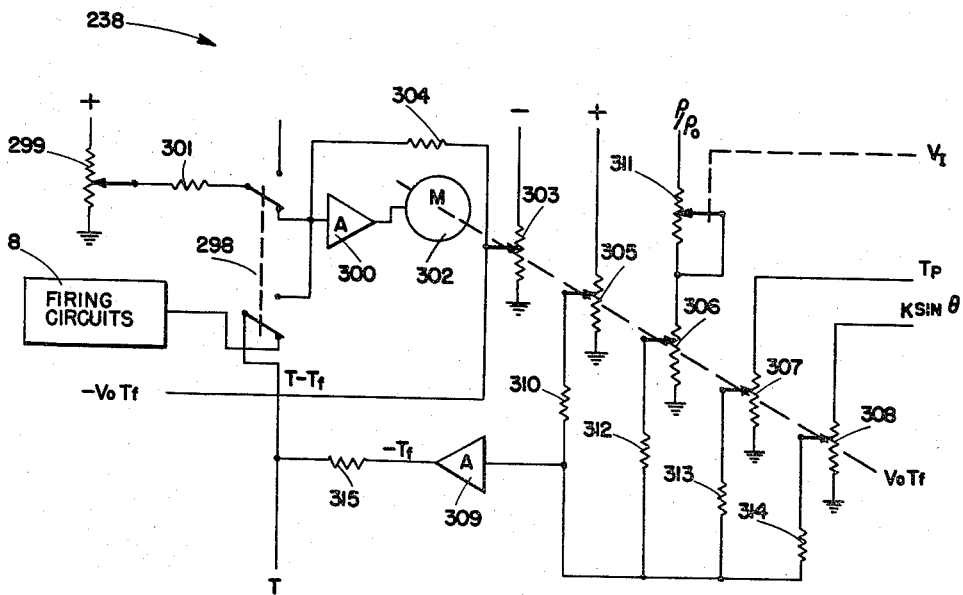
Fig. 40 is a schematic drawing of a time-of-flight servo.

Time-of-flight servo 238 is shown in detail in Fig. 40. When switch 298 is in the down position, time-of-flight servo 238 is set for a lead collision course of interceptor 3. A positive voltage is connected to one terminal of potentiometer 299 and the other terminal is connected to ground. The pilot of interceptor 3 hand-sets the position of potentiometer 299 for a given $V_0T_f$. This is the distance between interceptor 3 and target 2 at the time of impact of the rockets. The movable arm of potentiometer 299 is connected to the input of servo amplifier 300 through resistor 301 and switch 298. Servo amplifier 300 drives servo motor 302 to cause its shaft rotation to be proportional to $V_0T_f$. Potentiometer 303 is connected between a negative voltage and ground. The movable arm of potentiometer 303 is driven by the shaft of motor 302. The movable arm of potentiometer 303 is connected to the input of amplifier 300 through resistor 304. When the voltage upon the movable arm of potentiometer 303 is equal to the voltage upon the movable arm of potentiometer 299, the shaft rotation of motor 302 is precisely proportional to $V_0T_f$. The movable arm of potentiometer 303 is also connected to potentiometer 293 as shown more particularly in Fig. 39.

$$T_f = f_1(V_0T_f) + f_2(\rho/\rho_0, V_I, V_0T_f) + f_3(V_0T_f, T_p) + f_4(V_0T_f, \theta)$$

$f_1$, $f_2$, $f_3$, and $f_4$ are empirical functions which are mechanized experimentally by proper adjustment of potentiometers 305, 306, 307, 308, and 311. The function $f_1$ represents the variation of $T_f$ with $V_0T_f$ at a predetermined air density ratio, propellant temperature, interceptor velocity, and zero dive angle. The function, $f_2$, represents the effect of the variations of air density ratio and interceptor velocity upon $T_f$. The function, $f_3$, represents the effect of variations in propellant temperature of the rocket upon $T_f$. The function, $f_4$, represents the effect of change of dive or climb angle $\theta$. Thus, in Fig. 4 potentiometers 305, 306, 307, and 308 are not necessarily linear potentiometers and have their movable arms driven by servo motor 302. The electrical input to potentiometer 305 has a positive voltage. The movable arm of potentiometer 305 is connected to the input of amplifier 309 through resistor 310. Potentiometer 311 is mechanically driven by true air speed computer 123. The electrical input to potentiometer 311 is connected to air density computer 121. The movable arm to potentiometer 311 is connected to the stationary end of potentiometer 311 which is opposite the connection to air density computer 121. This movable arm is connected to the electrical input to potentiometer 306. The movable arm of potentiometer 306 is connected to the input of amplifier 309 through resistor 312. The electrial input of potentiometer 307 is connected to a voltage which is preset to be proportional to the propellant temperature of the rockets. The movable arm of potentiometer 307 is connected to the input of amplifier 309 through resistor 313. The electrical input of potentiometer 308 is connected to resolver 397 and has a voltage applied to it which is proportional to $K \sin \theta$. The movable arm of potentiometer 308 is connected to the input of amplifier 309 through resistor 314. The electrical outputs of potentiometers 305, 306, 307, and 308 are summed by summing amplifier 309 to create a voltage at the output of amplifier 309 which is equal to $-T_f$. The output of amplifier 309 is connected through resistor 315 to resistor 297 shown in Fig. 39 and to switch 298. A voltage proportional to $T-T_f$ is applied through switch 298 to firing circuits 8. When $T=T_f$, no voltage is applied to firing circuits 8 and the rockets are automatically released. When switch 298 is in its upper position, the junction between resistors 315 and 298 is connected to the input of amplifier 300. Potentiometer 299 and resistor 301 are disconnected from the input of amplifier 300 and no signal is sent to firing circuits 8. Amplifier 300 drives motor 302 so that a $V_0T_f$ is established which makes $T=T_f$.

Figure 41:
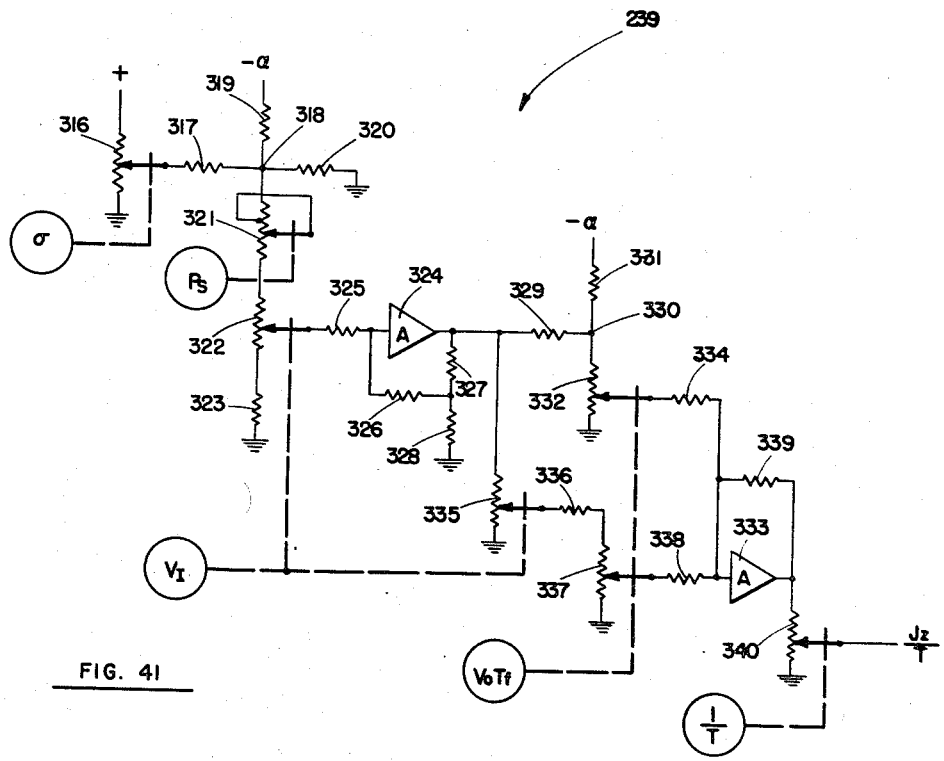
Fig. 41 is a schematic drawing of a pitch jump computer.

Pitch jump computer 239 is shown more particularly in Fig. 41. Potentiometer 316 is connected between a source of negative voltage and ground. Potentiometer 316 is mechanically adjusted in accordance with rocket pod angle $\sigma$. The movable arm of potentiometer 316 is connected through resistor 317 to junction 318. Resistor 319 is connected between junction 318 and angle of attack computer 117. Resistor 320 is connected between junction 318 and ground. The voltage at junction 318 is proportional to $(\sigma-\alpha)$. The $(\sigma-\alpha)$ voltage is connected to one terminal of potentiometer 321. Potentiometer 321 is mechanically driven by static pressure transducer 122. Potentiometer 321 is connected to one terminal of potentiometer 322 which is driven by true air speed computer 123. Launching factor, $f$, is a function of $P_s$ and $V_I$. The voltage upon the movable arm of potentiometer 322 is proportional to $(1-f)(\sigma-\alpha)$. Potentiometer 322 is connected to ground through resistor 323 and the movable arm of potentiometer 322 is connected to the input of amplifier 324 through resistor 325. Amplifier 324 is a feedback amplifier, and resistors 326, 327, and 328 are connected between the output and input of amplifier 324 to adjust the amount of feedback. The output of amplifier 324 is connected through resistor 329 to junction 330. Angle of attack computer 117 is connected by its negative terminal to junction 330 through resistor 331. The voltage at junction 330 is proportional to $$(1-f)(\alpha-\sigma)-\alpha$$

Junction 330 is connected to potentiometer 332 which is also connected to ground. Potentiometer 332 is mechanically driven by time-of-flight servo 238 in accordance with $V_0T_f$. The movable arm of potentiometer 332 is connected to the input of amplifier 333 through resistor 334. The voltage upon the movable arm of potentiometer 332 is proportional to $$[1-f)(\alpha-\sigma)-\alpha]V_0T_f$$

The output of amplifier 324 is connected to potentiometer 335. Potentiometer 335 is mechanically driven by true air speed computer 123. The movable arm of potentiometer 335 is connected through resistor 336 to potentiometer 337. Potentiometer 337 is driven by time-of-flight servo 238 in accordance with $V_0T_f$. Because $T_f$ is a function of $V_0T_f$ the linearity of potentiometer 337 is adjusted to cause potentiometer 337 to multiply its input by $T_f$. Hence the voltage upon the movable arm of potentiometer 335 is proportional to $(1-f)(\alpha-\sigma)V_I$ and the voltage upon the movable arm of potentiometer 337 is proportional to $(1-f)(\alpha-\sigma)V_IT_f$. The movable arm of potentiometer 337 is connected through resistor 337 to the input of amplifier 333. Amplifier 333 is a feedback amplifier and resistor 339 is connected between the output and input of amplifier 333 to provide the feedback. Amplifier 333 adds the voltages upon the movable arms of potentiometers 332 and 337. The output of amplifier 333 is connected to potentiometer 340. Potentiometer 340 is driven by time-until-hit servo 226 in accordance with $$\frac{1}{T}$$

The voltage upon the movable arm of potentiometer 340 is called the pitch jump function $$\frac{[(1-f)(\alpha-\sigma)-\alpha]V_0T_f}{T} - \frac{(1-f)(\alpha-\sigma)V_IT_f}{T}$$

Figure 42:
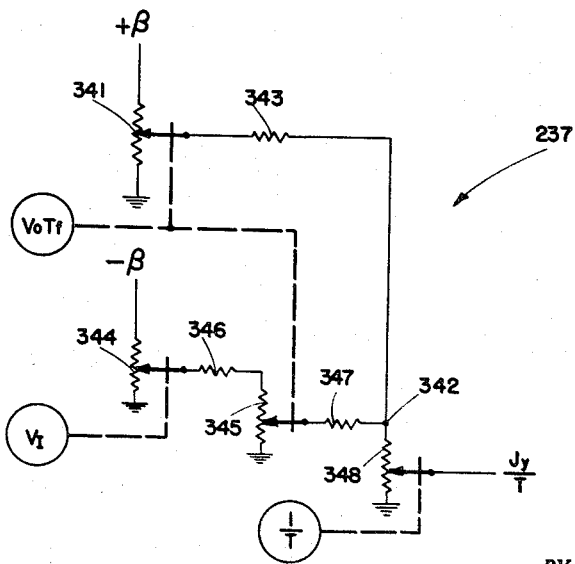
Fig. 42 is a schematic drawing of a yaw jump computer.

Yaw jump computer 237 is shown in detail in Fig. 42. Potentiometer 341 is connected to the positive terminal of angle of skid computer 118. Potentiometer 341 is mechanically connected to time-of-flight servo 238 and driven in accordance with $V_0T_f$. In the computer of Fig. 42, launching factor $f$ is assumed to be a constant. The movable arm of potentiometer 341 is connected to junction 342 through resistor 343. The voltage upon the movable arm of potentiometer 341 is proportional to $+fV_0T_f\beta$. Potentiometer 344 is connected to the negative terminal of angle of skid computer 118 and is mechanically driven by true air speed computer 123. The voltage upon the movable arm of potentiometer 344 is proportional to $-(1-f)V_I\beta$. The movable arm of potentiometer 344 is connected to potentiometer 345 through resistor 346. Potentiometer 345 is mechanically driven by time-of-flight servo 238 in accordance with $V_0T_f$. Because $T_f$ is a function of $V_0T_f$ the linearity of potentiometer 345 is adjusted to cause the voltage upon the movable arm of potentiometer 344 to be multiplied by $T_f$. Hence the voltage upon the movable arm of potentiometer 345 is proportional to $-(1-f)V_IT_f\beta$. The movable arm of potentiometer 345 is connected to junction 342 through resistor 347. The voltage at junction 342 is proportional to $$-[(1-f)V_IT_f - fV_0T_f]\beta$$

Junction 342 is connected to potentiometer 348 which is mechanically driven by time-until-hit servo 226 in accordance with $$\frac{1}{T}$$

The voltage upon the movable arm of potentiometer 348 is called the yaw jump function $$\frac{-\beta[(1-f)V_IT_f - fV_0T_f]}{T}$$

By inspection of Fig. 38, the pitch component of the miss distance $$M_z = R_{kz} - \alpha V_I(T - T_f) - \alpha V_R T_f + (1-f)(\alpha - \sigma)V_R T_f - G\cos\theta \cos\phi\, V_R T_f$$

The sin of each of the angles in Fig. 38 is substantially equal to the value of the angle. Similarly the yaw component of the miss distance $$M_y = R_{ky} - \beta V_I(T - T_f) - \beta V_R T_f + (1-f)(\beta V_R T_f - G\cos\theta \sin\phi\, V_R T_f$$

The steering error signals are in terms of velocity components $$\frac{M_z}{T}$$

and $$\frac{M_y}{T}$$

hereafter called $\epsilon_z$ and $\epsilon_y$.

$$\epsilon_z = \left(\frac{R_{Kz}}{T} - \alpha V_I\right) - \alpha\frac{V_0T_f}{T} + [(1-f)(\alpha - \sigma) - G\cos\theta \cos\phi]\frac{V_RT_f}{T}$$

$$\epsilon_y = \left(\frac{R_{Ky}}{T} - \beta V_I\right) - \beta\frac{V_0T_f}{T} + [(1-f)\beta - G\cos\theta \sin\phi]\frac{V_RT_f}{T}$$

In Fig. 35, a signal $$-\frac{R_{Ay}}{T}$$

is connected to summing amplifier 235 from resolver 228. The yaw jump signal from yaw jump computer 237 is connected to summing amplifier 235 and the $G\cos\theta\sin\phi$ output of resolver 398 is connected to summing amplifier 235. The output of summing amplifier 235 is connected to autopilot 6 and is proportional to $\epsilon_y$. A voltage proportional to $$-\frac{R_{Az}}{T}$$

is connected from resolver 230 to summing amplifier 236. The pitch jump signal is connected from pitch jump computer 239 to the input of summing amplifier 236. The $G\cos\theta\cos\phi$ output of resolver 398 is also connected to the input of summing amplifier 236. The output of summing amplifier 236 is connected to autopilot 6 and is proportional to $\epsilon_z$.

Autopilot

Autopilot 6 is connected between fire control computer 4 and the airframe of interceptor 3 to control the flight of interceptor 3 in response to aiming error signals.

Figure 43:
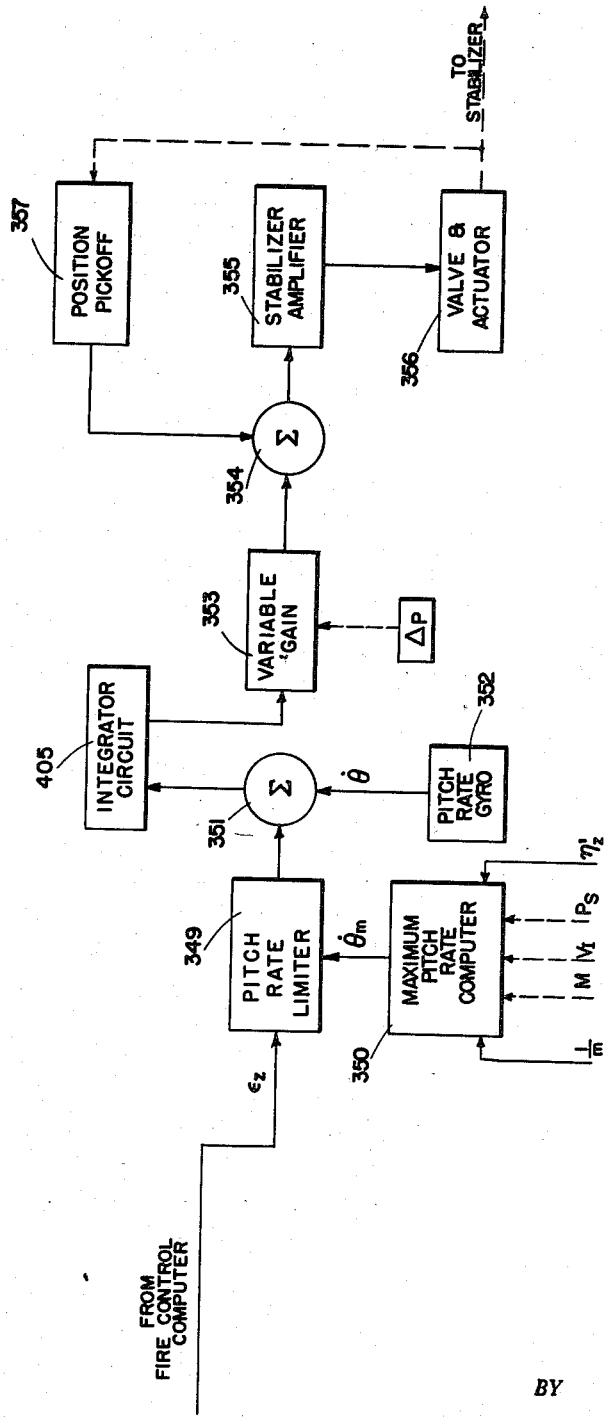
Fig. 43 is a block diagram of the pitch channel of an autopilot.

In Fig. 43 pitch rate limiter 349 is connected to the pitch aiming error output $\epsilon_z$ of fire control computer 4. Maximum pitch rate computer 350 has its input mechanically attached to Mach number computer 120 and static pressure transducer 122. The output of maximum pitch rate computer 350 is electrically connected to the input of pitch rate limiter 349. The maximum permissible pitch rate, computed by computer 350, includes the pitch rate at which interceptor 3 stalls, and a rate which depends upon the structural strength of interceptor 3. Pitch rate limiter 349 limits the error signal, $\epsilon_z$, in accordance with the output, $\theta_m$, of computer 350. The output of pitch rate limiter 349 is connected to the input of summing amplifier 351. Pitch rate gyro 352 is connected to the airframe of interceptor 3 and measures the pitch rate, $\theta$, thereof. The electrical output of gyro 352 is connected to the input of summing amplifier 351. The output of amplifier 351 is proportional to the difference between the desired pitch rate and the measured pitch rate of interceptor 3. The output of summing amplifier 351 is connected to the input of integrator circuit 405, the structure and operation of which is described hereinafter. Integrator circuit 405 establishes a steady state pitch signal to trim the stabilizer of interceptor 3 to cause the proper angle of attack to support the airframe. It has been determined by simulator studies that the amount of control of the control surfaces should be varied as a function of $\Delta P$ for the most efficient and rapid control of interceptor 3. Hence, the output of integrator circuit 405 is connected to the input of variable gain circuit 353. The mechanical input to variable gain circuit 353 is connected to differential pressure transducer 119. The electrical output of variable gain circuit 353 is connected to the input of summing amplifier 354. The signal which is transferred from variable gain circuit 353 to summing amplifier 354 is proportional to the desired position of the stabilizer of interceptor 3. The output of summing amplifier 354 is connected to stabilize amplifier 355, which provides the power to actuate valve and actuator 356. The output of amplifier 355 is connected to the input of valve and actuator 356. Valve and actuator 356 mechanically moves by means of a hydraulic system, the stabilizer of interceptor 3. Position pickoff 357 is mechanically attached to the stabilizer of interceptor 3 to detect the position thereof. The electrical signal from pickoff 357, proportional to the position of the stabilizer of interceptor 3, is connected to the input of summing amplifier 354. Hence, the output of amplifier 354 is proportional to the difference between the desired position of the stabilizer and the actual position of the stabilizer of interceptor 3.

Figure 45:
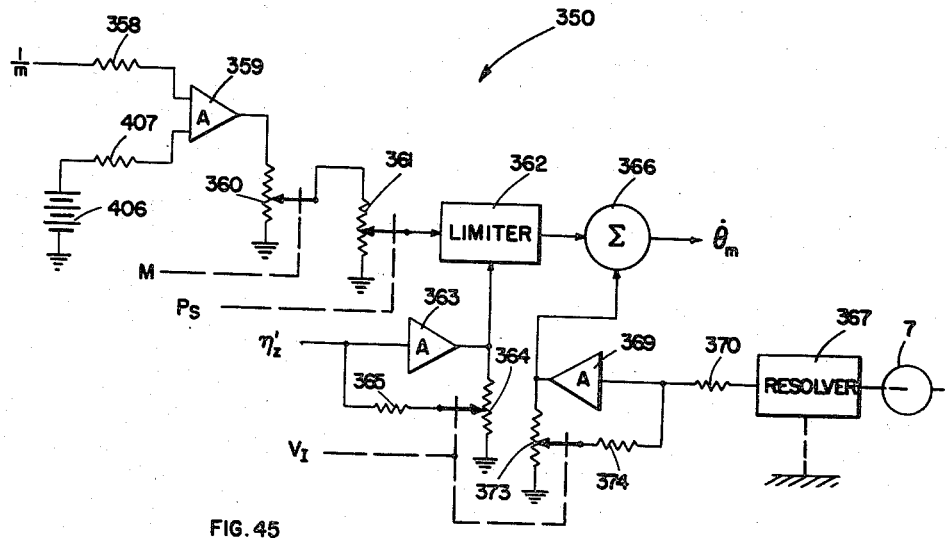
Fig. 45 is a schematic drawing of a maximum pitch rate computer of the pitch channel of an autopilot.

A typical maximum pitch rate computer 350 is shown in Fig. 45. Resistor 358 is connected to and receives from weight circuits 115 a signal proportional to $1/m$, the mass of interceptor 3. The other end of resistor 358 is connected to amplifier 359. Voltage source 406 is connected through resistor 407 to the input of amplifier 359. The resulting output voltage of amplifier 359 is proportional to the voltage of voltage source 406 minus a constant times $m$. The output of amplifier 359 is connected to nonlinear potentiometer 360. Potentiometer 360 is mechanically connected to Mach number computer 120. The movable arm of potentiometer 360 is connected to non-linear potentiometer 361. Potentiometer 361 is mechanically driven by static pressure transducer 122. The movable arm of potentiometer 361 is connected to the input of limiter 362. The signal upon the movable arm of potentiometer 361 is the maximum permissible pitch rate, beyond which interceptor 3 stalls. The input of amplifier 363 is connected to and receives from accelerometer circuits 116 a signal which is proportional to the acceleration of the accelerometers in the z direction. The output of amplifier 363 is connected to potentiometer 364. The movable arm of potentiometer 364 is driven by true air speed computer 123 and is electrically connected to the input of amplifier 363 through resistor 365. The resulting output of amplifier 363 is proportional to a predetermined constant multiplied by $\eta_z'$ and divided by $V_I$, which is the maximum structurally safe pitch rate for interceptor 3. The output of amplifier 363 is connected to the input of limiter 362. Limiter 362 is a conventional diode limiter which alternatively selects the smaller of its two input signals. The output of limiter 362 is connected to the input of summing amplifier 366. Resolver 367 is connected between vertical gyro 7 and the airframe of interceptor 3, along the roll axis of the interceptor to provide an electrical output which is proportional to the cosine of the pitch angle, $\phi$, of interceptor 3 with respect to the local vertical. The cosine $\phi$ output of resolver 367 is connected to the input of amplifier 369 through resistor 370. The voltage applied to the input of amplifier 369 is proportional to $-g \cos \phi$ wherein $g$ is the acceleration of gravity. The output of amplifier 369 is connected to potentiometer 373 which is mechanically driven by true air speed computer 123. The movable arm of potentiometer 373 is connected through resistor 374 to the input of amplifier 369 to effectively divide the output of amplifier 369 by $V_I$. The output of amplifier 369 is connected to the input of summing amplifier 366 and is subtracted thereby from the output of limiter 362. The amount of the signal from amplifier 369 is proportional to the required force to support the airframe without maneuvering. The output of summing amplifier 366 is proportional to $\theta_m$ and is connected to the input of pitch rate limiter 349 as set forth above.

In Fig. 46 integrating circuit 405 is shown in detail. The input to amplifier 375 is connected to the output of summing amplifier 351. Amplifier 375 drives motor 376 with a velocity which is proportional to the output signal of summing amplifier 351. The shaft rotation of motor 376 is proportional to the integral of the signal from summing amplifier 351. Potentiometer 377 has a constant voltage placed across it. Potentiometer 377 is mechanically driven by motor 376. The voltage upon the movable arm of potentiometer 377 is proportional to the integral of the input voltages to amplifier 375. The movable arm of potentiometer 377 is connected to the input of variable gain circuit 353 through resistor 378. The output of summing amplifier 351 is connected to the input of variable gain circuit 353 through resistor 379. Rapid changes in the error signal output of amplifier 351 pass through resistor 379 to the input of variable gain circuit 353. Errors which continue for an appreciable length of time compared to the time constant of the integrating circuit, comprising amplifier 375 and motor 376, cause the position of the arm of potentiometer 377 to take a substantially fixed position which places a voltage bias upon the input of variable gain circuit 353 to cause the pitch of interceptor 3 to adjust itself to an angle of attack which is just proper for the flight conditions under which it is operating.

Figure 44:
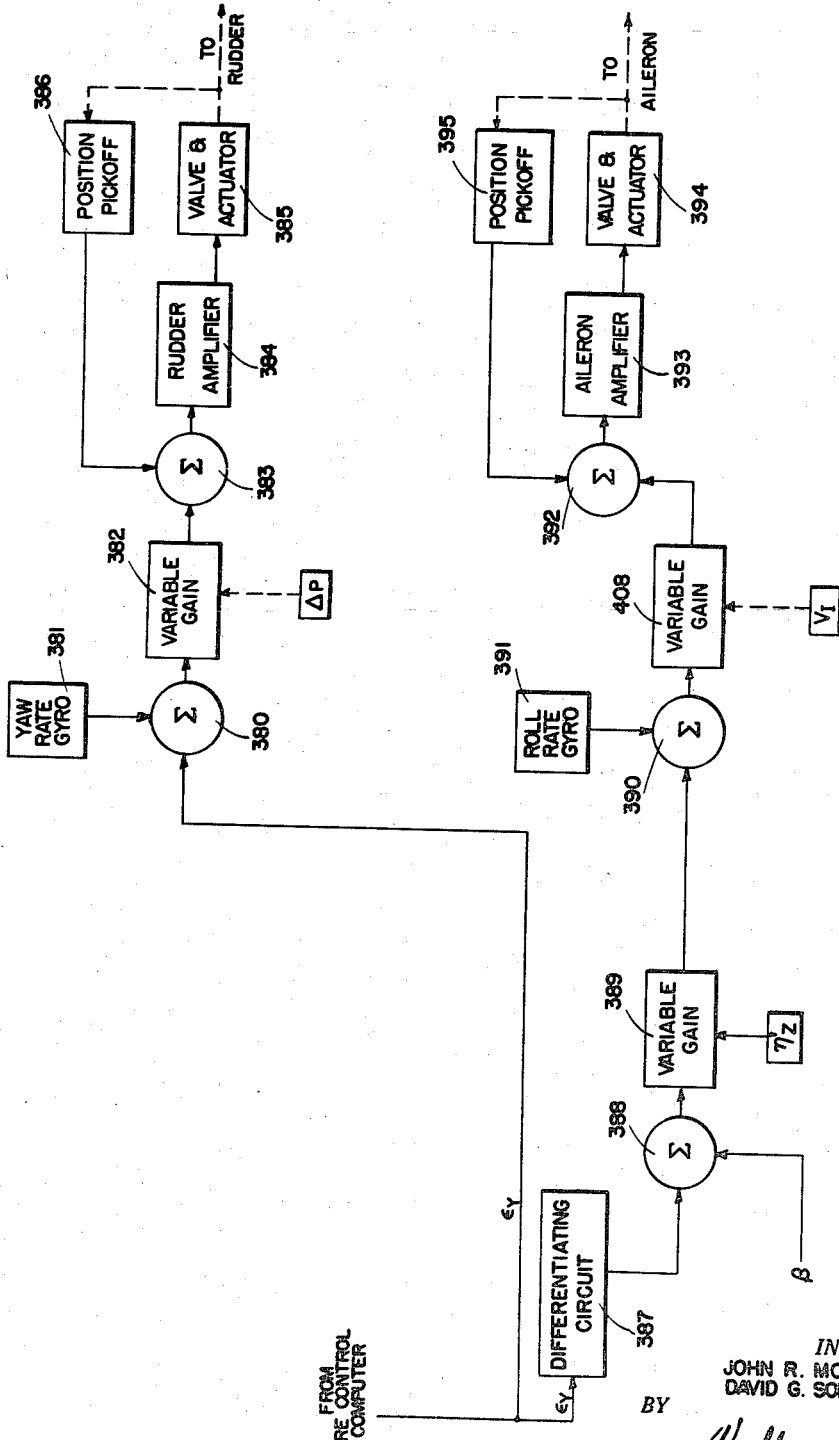
Fig. 44 is a block diagram of the roll-yaw of an autopilot.

In Fig. 44 the yaw error signal $\epsilon_y$ from fire control computer 4 is connected to summing amplifier 380. Yaw rate gyro 381 is connected to the airframe of interceptor 3. The electrical output of gyro 381 is connected to the input of summing amplifier 380. The difference between the desired yaw rate which is proportional to $\epsilon_y$ and the actual yaw rate measured by gyro 381 appears at the output of amplifier 380. It has been determined by simulated tests that the control of the rudder of interceptor 3 should vary with $\Delta P$ in order to have the most efficient response of interceptor 3 to its control signals. Hence the output of amplifier 380 is connected to the input of variable gain circuit 382. Variable gain circuit 382 is mechanically connected to differential pressure transducer 119. The output of variable gain circuit 382 is connected to the input of summing amplifier 383. The output of summing amplifier 383 is connected to the input of rudder amplifier 384. The output of rudder amplifier 384 is connected to the input of valve and actuator 385. Valve and actuator 385 is mechanically connected by means of a hydraulic system, to the rudder of interceptor 3. Position pickoff 386 is mechanically connected to the rudder of interceptor 3 to measure the position thereof. The electrical output of position pickoff 386 is controlled by the position of the rudder of interceptor 3. The output of pickoff 386 is connected to the input of amplifier 383. Hence, the output of amplifier 383 is proportional to the difference between the desired rudder position, represented by the output signal of circuit 382, and the actual rudder position, represented by the output of pickoff 386. When interceptor 3 turns about its yaw axis, it must roll by the proper amount about its roll axis to prevent skidding. The output signal $\epsilon_y$ of fire control computer 4 is connected to the input of differentiating circuit 387. The output of differentiating circuit 387 is connected to the input of summing amplifier 388. The input of summing amplifier 388 is also connected to angle of skid computer 118. The output of summing amplifier 388 is proportional to $\beta + \epsilon_y$. Hence, when there is no angular error, $\epsilon_y$, the output of summing amplifier 388 is merely proportional to $\beta$ and calls for a roll rate of interceptor 3 to maintain angle of skid $\beta$. It has been determined by simulator studies that the gain of the output of amplifier 388 must be adjusted in accordance with the acceleration of interceptor 3, $\eta_z'$ as measured by accelerometer circuits 116. The output of summing amplifier 388 is connected to the input of variable gain circuit 389. The input of variable gain circuit 389 is also connected to accelerometer circuits 116. The output of circuit 389 is proportional to the desired roll rate of interceptor 3. The output of circuit 389 is connected to the input of summing amplifier 390. Roll rate gyro 391 is connected to the airframe of interceptor 3. The electrical output of roll rate gyro 391 is connected to the input of summing amplifier 390. The output of summing amplifier 390 is proportional to the difference between the desired roll rate and the measured roll rate of interceptor 3. It has been determined by simulator studies that the effectiveness of the signal output of summing amplifier 390 may be varied as a function of interceptor velocity $V_I$ in order to create the best control conditions and still maintain stability of the airframe of interceptor 3. The output of summing amplifier 390 is connected to variable gain circuit 408 which is mechanically connected to the output of true air speed computer 123. The output of variable gain circuit 408 is connected to the input of summing amplifier 392. The output of amplifier 392 is connected to aileron amplifier 393. The output of aileron amplifier 393 is connected to valve and actuator 394. Valve and actuator 394 are mechanically connected by a hydraulic system to the ailerons of interceptor 3. Position pickoff 395 is mechanically connected to the aileron of interceptor 3 to measure the position thereof. The electrical output of pickoff 395 is proportional to the position of the aileron of interceptor 3. The electrical output of pickoff 395 is connected to the input of summing amplifier 392. Hence, the output of summing amplifier 392 is proportional to the difference between the desired position of the aileron and the measured position of the aileron of interceptor 3.

Summary

The device of this invention provides means for detecting range and azimuth of a target aircraft relative to an interceptor, means for computing angle of attack, angle of skid, air density, Mach number, true air speed, static pressure, differential pressure, and mass-times acceleration of the interceptor. The device of this invention also provides a fire control computer which includes means for predicting the point at which a rocket should be launched, the time between the launching of a rocket and the striking of the target, the pitch and yaw jump angles of rockets fired from an interceptor, and means for predicting the future position and velocity of the target. The device of this invention also provides an autopilot connected to the interceptor to control the control surfaces of the interceptor in accordance with signals from the fire control computer to cause the interceptor to follow a predetermined course along a lead-collision path or a lead-pursuit path.

The design of the components of the fire and flight control system of this invention is integrated to utilize a minimum number of parts for the overall system and to keep the weight to a minimum consistent with accuracy. Thus, the aircraft in combination with the flight data computer, fire control computer, autopilot, and guns or rockets of this invention provides an effective weapon which intercepts and destroys a target aircraft in a minimum period of time with maximum effectiveness.

Although the description set forth herein assumes that the target is moving at a substantially constant velocity, it is apparent that the fire control computer, and in particular the vector filter therein, is capable of computing the instantaneous acceleration of the target with respect to the interceptor to decrease the aiming error between the interceptor and the target. An additional stage of vector filtering would, of course, be needed. It is also apparent that, while one additional stage of vector filtering is all that would be needed to compensate for substantially constant accelerations of the target, still another stage of vector filtering would compensate for instantaneous changes in acceleration of the target. Hence the aiming error between the interceptor and the target can be decreased as much as desired by the device of this invention, and is only limited by considerations of economy and weight.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Apparatus for causing an interceptor aircraft to approach a target along a predetermined path relative to said target, said craft having suitable control means operable to effect rotation thereof comprising, in combination, electrically operated means for operating said control means, means for computing the range and direction of said target relative to said interceptor, means for computing the Mach number, angle of attack, angle of skid, true velocity, and acceleration of said interceptor, means responsive to said computing means to provide an electrical error signal to said electrically operated means for operating said control means whereby said interceptor approaches said target along a predetermined path and is pointed in a direction relative to said target so that when the weapons of said interceptor are fired the projectile from said weapons strikes said target.

2. A device as recited in claim 1 and further comprising ballistic weapons positioned and oriented upon said interceptor, and means responsive to the distance between said interceptor and said target for automatically firing said weapons at a predetermined fixed distance between said interceptor and said target.

3. Apparatus for causing an interceptor aircraft having ballistic weapons thereon to approach a target along a predetermined path and to fire said ballistic weapons at a predetermined distance from said target, said interceptor aircraft having suitable control means operable to control the direction of flight of said interceptor comprising, in combination, autopilot means connected to said control means, means for detecting the range and direction of said target, means for computing the velocity of said target relative to said interceptor, means connected to the output of said distance and direction measuring means to continuously compute and predict the desired direction of pointing of said interceptor to cause said interceptor to approach said target along a predetermined path, flight parameter computing means for generating signals indicative of the velocity and the acceleration of said interceptor connected to the input of said interceptor pointing means, said interceptor pointing means including means for generating an error signal connected to the input of said autopilot and indicative of the deviation of the interceptor flight direction from said path, and means connected to the output of said interceptor pointing means to automatically fire said ballistic weapons at a predetermined distance from said target whereby said interceptor approaches said target along a predetermined path and said ballistic weapons are automatically fired at a predetermined distance from said target.

4. In a system for controlling the path of an interceptor carrying ballistic weapons including operating means for effecting motion of said interceptor, the combination of prediction computer means for continuously computing the future time until the projectile from said weapons upon said interceptor will strike said target, ballistic computer means for pointing said interceptor at an attitude relative to said target so that when said weapons are fired the projectile therefrom strikes said target, means for computing the angle of attack, angle of skid, Mach number, true velocity of said interceptor and the air density at the altitude said interceptor is flying, connected to the input of said prediction computer means and said ballistic computer means, a vertical gyroscope gimballed within said interceptor having electrical outputs which are a measure of the attitude of said interceptor relative to the acceleration of gravity, said electrical outputs of said gyroscope being connected to the input of said prediction computer means and said ballistic computer means, and means for measuring the distance and direction of said target relative to said interceptor having an electrical output connected to the input of said ballistic computer means and said prediction computer means whereby said interceptor approaches said target at a predetermined attitude relative to said target along a predetermined path and said prediction circuits automatically fire said weapons.

5. Apparatus for controlling the control surfaces of an interceptor aircraft to cause said interceptor aircraft to approach a target along a predetermined path relative to said target comprising, in combination, means for pointing said interceptor in a predetermined angular relationship to said target to cause said interceptor to approach said target along a predetermined path, means connected to the input of said interceptor pointing means to measure the distance and direction of said target relative to said interceptor, means for computing the Mach number of said interceptor connected to the input of said interceptor pointing means, means for computing the true velocity of said interceptor connected to the input of said interceptor pointing means, means for computing the angle of attack of said interceptor connected to the input of said interceptor pointing means, means for computing the angle of skid of said interceptor connected to the input of said interceptor pointing means, vertical gyroscope means responsive to the attitude of said interceptor relative to the direction of gravity having an electrical output connected to the input of said interceptor pointing means, the output of said interceptor pointing means being connected to the input of said means for controlling said control surfaces whereby said interceptor approaches said target along a predetermined path.

6. Apparatus for controlling the control surfaces of an interceptor to cause said interceptor to approach a target along a lead collision path and to fire ballistic weapons carried by said interceptor at a predetermined distance from said target comprising autopilot means for controlling said control surfaces, control computer means connected to the input of said autopilot means for computing the error in heading of said interceptor relative to said path, flight data computing means including flight parameter sensing devices for generating signals indicative of the attitude of said interceptor, the Mach number of said interceptor, the angle of attack of said interceptor, the angle of skid of said interceptor and the true velocity of said interceptor, means for feeding said signals to said control computer means, means connected to the input of said control computer means for measuring the direction and distance of said target relative to said interceptor, said control computer means continuously computing the time until said weapons are automatically fired, the output of said control computer means being connected to said weapons to automatically fire said weapons at a predetermined distance of said interceptor from said target.

7. An automatic fire and flight control system comprising an interceptor; ballistic weapons, a radar, angle of attack computing means, air density computing means, angle of skid computing means, true air speed computing means, Mach number computing means, and autopilot means upon said interceptor, said autopilot means being connected to control the control surfaces of said interceptor, weapon firing computer means upon said interceptor for determining when to fire said weapons, and course computing means upon said interceptor for determining the course of said aircraft to intercept a target aircraft; a vertical gyroscope gimballed within said interceptor, the relative range, azimuth, and elevation outputs of said radar being connected to the input of said course computer means, the output of said angle of attack computing means, said air density computing means, said angle of skid computing means, said true air speed computing means and said Mach number computing means being connected to said course computing means and said weapon firing computing means, said weapons being connected to said weapon firing computer means, said course computing means being connected to said autopilot; and pick-off means between said vertical gyroscope and said aircraft to measure the relative attitude of said interceptor, said pick-off means being connected to said course computing means and to said autopilot whereby said radar determines the bearing and range of a target aircraft relative to said interceptor, said course computing means combines the information from said radar and from said angle of attack computing means, said air density computing means, said angle of skid computing means, said true air speed computing means, and said Mach number computing means to control said autopilot which in turn causes said aircraft to travel a course to intercept said target, and to control said weapon firing computer means to fire said weapons at a predetermined position of said interceptor relative to said target.

8. Means for intercepting and destroying a target aircraft comprising an interceptor aircraft; means for detecting the range and bearing of said target relative to said interceptor; flight data computer means for determining Mach number, true airspeed, air density, angle of attack, angle of skid, static pressure, and differential pressure of said interceptor; course computing means for computing a course to be followed by said interceptor to intercept said target; ballistic weapons upon said interceptor; automatic weapon firing means connected to said weapons to automatically fire said weapons at a predetermined position of said interceptor relative to said target; and an autopilot connected to said interceptor to control the flight thereof, said means for determining range and bearing of said target and said flight data computer means being connected to said course computing means, said course computing means being connected to said autopilot and to said automatic weapon firing means whereby said interceptor approaches said target by a predetermined path and fires said weapons at a predetermined position of said interceptor relative to said target.

9. An automatic fire and flight control system comprising an interceptor; ballistic weapons upon said interceptor; a radar upon said interceptor; angle of attack computing means upon said interceptor, air density computing means upon said interceptor; angle of skid computing means upon said interceptor; true air speed computing means upon said interceptor, Mach number computing means upon said interceptor, an autopilot upon said interceptor connected to control the control surfaces of said interceptor; weapon firing computer means upon said interceptor for determining when to fire said weapons; course computing means upon said interceptor for determining the course of said aircraft to intercept a target aircraft; a vertical gyroscope gimballed within said interceptor, the relative range, azimuth and elevation outputs of said radar being connected to the input of said course computer means, the output of said angle of attack computing means, said air density computing means, said angle of skid computing means, said true air speed computing means and said Mach number computing means being connected to said course computing means and said weapon firing computing means; said weapons being connected to said weapon firing computer means, said course computing means being connected to said autopilot; pick-off means between said vertical gyroscope and said aircraft to measure the relative attitude of said interceptor, said pick-off means being connected to said course computing means and to said autopilot whereby said radar determines the bearing and range of said target aircraft relative to said interceptor; said course computing means combines the information from said radar and from said angle of attack computing means, said air density computing means, said angle of skid computing means, said true air speed computing means, and said Mach number computing means to control said autopilot which in turn causes said aircraft to travel a course to intercept said target, and to control said weapon firing computer means to fire said weapons at a predetermined position of said interceptor relative to said target.

10. Means for intercepting and destroying a target aircraft comprising an interceptor; means for detecting the range and bearing of said target relative to said interceptor; flight data computer means for compiling Mach number, true airspeed, air density, angle of attack, angle of skid, static pressure, and differential pressure of said interceptor; course computing means for computing a course to be followed by said interceptor to intercept said target, ballistic weapons upon said interceptor; automatic weapon firing means connected to said weapons to automatically fire said weapons at a predetermined position of said interceptor relative to said target; and an autopilot connected to said interceptor to control the flight thereof; said means for determining range and bearing of said target and said flight data computer means being connected to said course computing means, said course computing means being connected to said autopilot and to said automatic weapon firing means whereby said interceptor approaches said target by a predetermined path and fires said weapons at a predetermined position of said aircraft relative to said target.

11. Means for causing an interceptor aircraft to approach a target aircraft along a predetermined course comprising a radar, a fire control computer, a flight data computer, a vertical gyroscope and an autopilot upon said interceptor, the output of said radar being connected to the input of said fire control computer to provide said fire control computer with target bearing and range signals, the output of said flight data computer being connected to the input of said fire control computer and said autopilot to provide said fire control computer and said autopilot with aircraft and flight intelligence signals, the output of said vertical gyroscope being connected to the input of said fire control computer and said autopilot to provide said fire control computer and said autopilot with pitch and roll signals, the output of said fire control computer being connected to the input of said autopilot to provide said autopilot with aiming and positioning error signals, said autopilot being connected to control the control surfaces of said interceptor whereby said interceptor approaches said target along a predetermined path or course.

12. A device as recited in claim 11 in which said flight data computer comprises means for measuring static pressure, means for measuring the difference between ram and static pressure, means for measuring the weight of said interceptor, means for measuring the acceleration of said interceptor in the direction of its z axis, means for measuring the acceleration of said interceptor in the direction of its y axis, means for computing angle of attack of said interceptor, means for computing angle of skid of said interceptor, means for computing the Mach number of said interceptor, means for computing the true airspeed of said interceptor, and means for computing the air density at the elevation said interceptor is flying, the output of said weight measuring means being connected to the input of said acceleration measuring means, the output of said z axis acceleration measuring means being connected to the input of said angle of attack computing means, the output of said y axis acceleration measuring means being connected to the input of said angle of skid computing means, the output of said static pressure measuring means being connected to the input of said Mach number computing means, the output of said pressure difference measuring means being connected to the input of said Mach number computing means, said angle of attack computing means, said angle of skid computing means, and said air density computing means, the output of said Mach number computing means being connected to the input of said angle of attack computing means, said angle of skid computing means, said true airspeed computing means, and said air density computing means, the output of said true airspeed computing means being connected to the input of said air density computing means.

13. A device as recited in claim 11 in which said fire control computer comprises means for transforming target range and bearing signals from radar coordinates into aircraft coordinates, means for correcting the attitude of said interceptor to compensate for jump of the projectile of ballistic weapons upon said interceptor, and means for correcting the attitude of said interceptor to compensate for the effect of acceleration of gravity upon the projectile of ballistic weapons upon said interceptor.

14. Computing means for causing a rocket-carrying interceptor aircraft to approach a target aircraft by a predetermined path comprising a radar gimballed upon said interceptor, driving means connected to said radar to cause said radar to point in the direction of said target relative to said interceptor and to measure the range and direction thereof, said driving means being connected to the output of said radar to be controlled thereby, three rate gyroscopes connected to said radar, said rate gyroscopes having their sensitive axes mutually perpendicular to provide electrical signals proportional to the angular velocity of said radar about their sensitive axes relative to inertial space, angular sensing means mechanically connected between said radar and said interceptor to provide electrical signals which are a measure of the angular orientation of a set of coordinates fixed upon said radar relative to a set of coordinates fixed upon said interceptor, angle of attack computing means, angle of skid computing means, Mach number computing means, true airspeed computing means, and air density computing means upon said interceptor, means for multiplying the output from said angle of skid computer by the output from said true airspeed computer, means for multiplying the output of said angle of attack computer by the output of said true airspeed computer, resolver means connected to said angular sensing means between said radar and said interceptor connected to the output of said true airspeed computer and to the output of said true airspeed angle of skid multiplying means and to the output of said true airspeed angle of attack multiplying means to obtain electrical signals proportional to the velocity of said interceptor expressed in coordinates of said radar, a vector filter, the output of said resolver means being connected to the input of said vector filter, the output of said vector filter being an electrical signal which is proportional to the vector velocity of said target expressed in radar coordinates, means for computing the distance between said interceptor and said target at the predicted time when said rockets strike the target, said computing means being connected to the output of said vector filter, means connected to said angle sensing means between said radar and said interceptor to transform the coordinates of advance range into interceptor coordinates, means for computing the time of flight of said rockets, means for computing the jump of said rockets in the direction of the yaw axis of the interceptor, means for computing the jump of said rockets in the direction of the pitch axis of said computer, means for computing the drop of said rockets due to the acceleration of gravity and means for resolving the gravity drop of said rockets into interceptor coordinates, said means for computing the time of flight of said rockets being connected to the output of said air density computing means, said means for computing rocket jump in the direction of the yaw axis of said interceptor being connected to the output of said angle of skid computer and to the output of said true velocity computer, said means for computing jump of said rockets in the direction of said pitch axis being connected to the output of said angle of attack computing means and the output of said true airspeed computing means, means for computing the error between the attitude of said interceptor and the desired attitude of said interceptor to cause said rockets to destroy said target, an autopilot connected to said interceptor to control said interceptor, said error computing means being connected to the input of said autopilot to cause said autopilot to move said control surfaces of said interceptor to cause said interceptor to approach said target along a predetermined path whereby when said rockets are fired, said rockets strike said target.

15. A fire and flight control system for an interceptor aircraft comprising tracking means for generating target signals indicative of the tracked location of a target, autopilot means for controlling the heading of said interceptor, flight data computing means including flight parameter sensing devices for generating correction signals in accordance with predetermined functions of said sensed parameters, fire control computing means responsive to said target and correction signals for computing a predetermined interceptor flight path relative to said target in accordance with the equation $\bar{R}_k = \bar{R} + \bar{V}_B T$ where $\bar{R}_k$ is the range vector between present interceptor position and a future target position, $\bar{R}$ is the range vector between present position of interceptor and target, $\bar{V}_B$ is target velocity, and T is the time required for the target to reach said future position, said fire control computing means generating an error signal indicative of the deviation of the heading of said interceptor from said path, and means for controlling said autopilot means in response to said error signal to cause said interceptor to follow said path.

16. The system of claim 15 wherein said sensing devices include means for sensing static and ram pressure external of said interceptor, and means for sensing lateral acceleration of said interceptor.

17. A fire and flight control system for an interceptor comprising tracking means for generating target signals indicative of the tracked location of a target, flight data computing means including pressure sensing devices for generating a signal indicative of true air speed of said interceptor, means responsive to said target and true air speed signals for generating a signal indicative of target velocity, control means responsive to said signals for computing a predetermined flight path of said interceptor relative to said target and for generating an error signal in accordance with the deviation of said interceptor from said path, and autopilot means responsive to said error signal for guiding said interceptor along said path.

References Cited in the file of this patent

UNITED STATES PATENTS

| | | |
|---|---|---|
| 2,420,017 | Sanders | May 6, 1947 |
| 2,433,843 | Hammond | Jan. 6, 1948 |
| 2,434,813 | Sanders | Jan. 20, 1948 |
| 2,444,171 | Sanders | June 29, 1948 |
| 2,444,678 | Sanders | July 6, 1948 |
| 2,512,693 | Sparks | June 27, 1950 |
| 2,557,401 | Agins | June 19, 1951 |
| 2,616,625 | Griest | Nov. 4, 1952 |
| 2,624,510 | LaCoste | Jan. 6, 1953 |
| 2,704,490 | Hammond | Mar. 22, 1955 |

UNITED STATES PATENT OFFICE
CERTIFICATE OF CORRECTION

Patent No. 2,933,980              April 26, 1960

John R. Moore et al.

It is hereby certified that error appears in the printed specification of the above numbered patent requiring correction and that the said Letters Patent should read as corrected below.

Column 14, line 61, for "is an" read -- in an --; column 16, lines 26 to 28, the right-hand portion of the equation reading "+$W\eta_z{'}f_2(M)$" read -- +$W\eta_z{'}f_3(M)$ --; column 19, line 28, for "$W\eta_y{'}f{'}(M)$" read -- $W\eta_y{'}f_2(M)$ --; line 42, for "$W\eta_z f_1(M)$" read -- $W\eta_z{'}f_1(M)$ --; same column 19, line 75, the equation should appear as shown below instead of as in the patent:

$$W\eta_z{'}f_1(M)+W\eta_z{'}\Delta P f_3(M)+\Delta P\alpha_0(M)+\Delta P K_\alpha$$

column 21, lines 6 to 8, the equation should appear as shown below instead of as in the patent:

$$\dot{R} = \dot{R}\bar{\imath}+(\bar{\omega}\times\bar{R})$$

column 28, line 57, for "337" read -- 338 --; column 29, line 42, in the equation, strike out the opening parenthesis, third occurrence.

Signed and sealed this 29th day of November 1960.

(SEAL)
Attest:

KARL H. AXLINE
Attesting Officer

ROBERT C. WATSON
Commissioner of Patents